United States Patent
Oshins et al.

(10) Patent No.: US 7,577,856 B2
(45) Date of Patent: *Aug. 18, 2009

(54) UNIFIED DEVICE POWER MANAGEMENT ENGINE

(75) Inventors: Jacob Oshins, Seattle, WA (US); Doron J. Holan, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 487 days.

This patent is subject to a terminal disclaimer.

(21) Appl. No.: 10/953,942

(22) Filed: Sep. 29, 2004

(65) Prior Publication Data

US 2005/0246560 A1 Nov. 3, 2005

Related U.S. Application Data

(63) Continuation of application No. 10/833,534, filed on Apr. 28, 2004, now Pat. No. 7,313,708, and a continuation of application No. 10/833,542, filed on Apr. 28, 2004, now Pat. No. 7,308,586.

(51) Int. Cl.
*G06F 1/32* (2006.01)

(52) U.S. Cl. .................... 713/300; 713/320
(58) Field of Classification Search .......... 713/300–375
See application file for complete search history.

(56) References Cited

U.S. PATENT DOCUMENTS

| | | | |
|---|---|---|---|
| 5,530,858 A | 6/1996 | Stanley et al. | |
| 5,590,342 A | 12/1996 | Marisetty | |
| 5,696,970 A | 12/1997 | Sandage et al. | |
| 5,752,050 A | 5/1998 | Hernandez et al. | |
| 5,754,869 A * | 5/1998 | Holzhammer et al. | 713/300 |
| 5,794,035 A | 8/1998 | Golub et al. | |
| 5,903,894 A | 5/1999 | Reneris | |
| 5,925,134 A * | 7/1999 | Solomon | 713/324 |
| 5,944,831 A * | 8/1999 | Pate et al. | 713/324 |
| 5,953,536 A | 9/1999 | Nowlin, Jr. | |
| 6,092,209 A | 7/2000 | Holzhammer et al. | |
| 6,477,655 B1 * | 11/2002 | Delvaux et al. | 713/323 |
| 6,557,106 B1 | 4/2003 | Yuzawa et al. | |
| 6,802,014 B1 * | 10/2004 | Suurballe | 713/300 |
| 6,832,278 B2 * | 12/2004 | Oshins et al. | 710/104 |
| 7,051,218 B1 * | 5/2006 | Gulick et al. | 713/310 |

(Continued)

OTHER PUBLICATIONS

Stein J. Ryan. Synchronization in Portable Device Drivers. ACM SIGOPS, vol. 33 Issue 1, pp. 18-25, 1999.

(Continued)

*Primary Examiner*—Thomas Lee
*Assistant Examiner*—Paul B Yanchus, III
(74) *Attorney, Agent, or Firm*—Wolf, Greenfield & Sacks, P.C.

(57) ABSTRACT

The present invention provides a unified layer for Plug and Play (PnP) components and power management components while relieving device drivers from system-level complexities associated with implementing PnP and/or power management functionality. The layer operates at a level between low-level device drivers and more complex operating system tasks. The subject invention simplifies designing device drivers having proper power management support by creating an infrastructure that allows a device driver to operate within a driver framework or model and without having to process Plug-and-Play or Power Management I/O Request Packets (IRPs) directly.

30 Claims, 10 Drawing Sheets

U.S. PATENT DOCUMENTS

| | | | |
|---|---|---|---|
| 7,103,788 B1 | 9/2006 | Souza et al. | |
| 7,174,467 B1* | 2/2007 | Helms et al. | 713/300 |
| 7,313,708 B2* | 12/2007 | Oshins et al. | 713/300 |
| 2005/0102681 A1 | 5/2005 | Richardson | |
| 2005/0108369 A1 | 5/2005 | Sather et al. | |
| 2005/0144330 A1 | 6/2005 | Richardson | |

OTHER PUBLICATIONS

G. Vargas-Solar and C. Collet. Adees, an Open Event-based Infrastructure for Distributed Information Systems. Submitted to VLDB 2001. 20 pages.

G. Cugola, E. Di Nitto, and A. Fuggetta. Exploiting and Event-based Infrastructure to Develop Complex Distributed Systems. In Proc. of the 19th International Conference on Software Engineering, pp. 261-270, 1998.

OnNow Power Management and WDM. Microsoft Corporation. Last Updated: Dec. 4, 2001. http://www.eu.microsoft.com/whdc/archive/OnNowWDM.mspx, 7 pages.

Hewlett-Packard Corporation, et al., Advanced Configuration and Power Interface Specification, Sep. 2, 2004.

* cited by examiner

EXEMPLARY PNP EVENTS

AddDevice
IRP_MN_START_DEVICE
IRP_MN_START_DEVICE Complete
PowerUp
PowerDown
IRP_MN_QUERY_REMOVE_DEVICE
IRP_MN_QUERY_STOP_DEVICE
IRP_MN_CANCEL_REMOVE_DEVICE
IRP_MN_CANCEL_STOP_DEVICE
IRP_MN_STOP_DEVICE
IRP_MN_REMOVE_DEVICE
IRP_MN_SURPRISE_REMOVE_DEVICE
IRP_MN_EJECT
ParentRemoved

EXEMPLARY POWER EVENTS

500

IRP_MN_SET_POWER
PowerImplicitD0
PowerImplicitD3
IRP_MN_WAIT_WAKE - Arrival at PDO
IRP_MN_WAIT_WAKE - Complete
IRP_MN_WAIT_WAKE - Succeeded
IRP_MN_WAIT_WAKE - Canceled
PowerPolicyStopRemove
MarkPowerNonPageable
MarkPowerPageable
ParentMovingToD0

FIG. 5

UNIFIED DEVICE POWER MANAGEMENT ENGINE

CROSS REFERENCE TO RELATED APPLICATIONS

This application is a continuation of U.S. patent application Ser. No. 10/833,534 filed Apr. 28, 2004, entitled INTERLOCKED PLUG AND PLAY WITH POWER MANAGEMENT FOR OPERATING SYSTEMS. This application is also a continuation of U.S. patent application Ser. No. 10/833,542 filed Apr. 28, 2004, entitled INTERLOCKED PLUG AND PLAY WITH POWER MANAGEMENT FOR OPERATING SYSTEMS, the entirety of both applications are incorporated herein by reference.

TECHNICAL FIELD

The present invention relates generally to systems and methods that facilitate power management between devices, drivers, systems, and processes. More particularly, the present invention relates to a middleware or system level layer that offloads power management decisions and processing from lower level device drivers to an operating system framework.

BACKGROUND OF THE INVENTION

Some operating systems support the concepts of Plug and Play (PnP), Power Management and System Management for a plurality of different device drivers. Unfortunately, the complexity involved in implementing PnP and Power has caused thousands of device drivers to be written in a manner that may cause operating system problems (e.g., system crash). Beyond system failures, many designers of device drivers choose to simplify their drivers as much as possible, so that they do not have to complicate their designs with difficult programming problems, testing problems, and/or verification problems. This often leads to drivers which perform Power Management in the simplest way possible, which is merely to leave the corresponding device turned on, consuming fill power at all times. This consequently leads to laptop and tablet computers that consume more energy than they need to, thus causing shorter battery life than possible.

In one current operating system scenario, existing programming models do not always facilitate implementing PnP and Power management considerations in an efficient or robust manner. For example, a PnP "start" event may be modeled as an implicit power-up event, even though the power manager did not send it. Similarly, PnP "stop" and "remove" events are implicit power-down events. This implies that coordination and synchronization between PnP and Power events would then be performed inside every device driver, and not merely inside PnP or Power Managers.

In another example, power management in some models may be broken into two separate concepts, system power management and device power management. Thus, the operating system (or components associated therewith) decides when the system is awake or asleep, and the individual device drivers decide when the devices should be awake or asleep. In many ways, this is desired, since it implies that device power policy can be managed by software components that have the most device domain knowledge. In many other ways, it's frustrating for a device driver designer, since it forces the designer to track system power states, responding to them by putting the device into appropriate device power states. This tracking and coordination is complex and error-prone at best.

In order to save battery power, it should be theoretically possible to turn off devices that aren't currently being used. This goal is difficult to achieve with existing models, since the device driver has to track system concepts such as general idleness, time since the device was last asked to perform a task, and so forth. Turning unused devices off can certainly save power, however many devices need to remain powered on in order that software can be aware that a human has interacted with them. A good example is a floppy disk drive. It would be desirable if the floppy were turned off when it is not being used, since it is very rarely used in many situations. The operating system can certainly turn it on before it starts writing to the floppy or reading from it. The problem arises when a user puts a new floppy into the drive. Software should typically respond by changing any windows that currently show the contents of the floppy, and updating them with the list of newly inserted files. If a "disk-change notification" is not sent, then the device cannot be turned off.

The above floppy drive problem can be solved in a drivers framework by allowing each device to have a "wake signal" at the hardware level that can bring the device back into a working state. The problem is that almost all hardware in existence ties the wake signal into logic that controls the current power state, and the current power state is managed with a completely separate event. Thus, device drivers are forced to use two completely separate and unsynchronized events to manage a process that is essentially an interconnected and synchronized hardware subsystem. In view of the problems listed above and others, many machines such as laptop computers suffer from poor battery life.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that support Plug and Play (PnP) and power management operations at a higher-level domain than at a device driver level. In one aspect, the present invention creates an infrastructure that allows a device driver to operate within an operating system framework or model without having to process Plug-and-Play or Power Management events (e.g., I/O Request Packets (IRPs)) directly. The infrastructure provides system and device level synchronization of PnP and power related events that effectively coordinates and guides efficient power operations. Such operations include allowing devices to remain in low power states to conserve battery life while mitigating complex system level considerations for entering and returning from these states.

In one aspect, the present invention merges the concepts of PnP and Power, which are largely separate in various operating system models. One example implementation of the present invention includes employment of three state machines that act as a layer to bridge operating system components and device driver power requirements. This layer of state machines creates an environment for device drivers that processes operating system interactions on behalf of the driver, allowing the driver to only implement the components needed for desired driver functionality. Furthermore, the layer is rich enough to allow a device to save maximal power without much coding or design effort on the part of the driver designer.

The present invention offers several advantages over conventional operating system models such as: Significantly improving the quality of device drivers, which can directly reduce the number of system problems; Can be provided as part of a "Driver Framework" which mitigates code development for driver designers; Significantly improve opportunities for battery life savings including system tuning and power optimization algorithms; and Allowing a driver written for one style of operating system to be easily migrated to another style of operating system by removing power management and PnP processing from the device layer to middle or system level layers.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 4 illustrates exemplary events for a PNP state machine in accordance with an aspect of the present invention.

FIG. 5 illustrates exemplary events for a Power state machine in accordance with an aspect of the present invention.

DETAILED DESCRIPTION OF THE INVENTION

The present invention provides a unified layer for Plug and Play (PnP) components and power management components while relieving device drivers from system-level complexities associated with implementing PnP and/or power management functionality. The layer operates at a level between low-level device drivers and more complex operating system tasks. The subject invention simplifies designing device drivers having proper power management support by creating an infrastructure that allows a device driver to operate within a driver framework or model and without having to process Plug-and-Play or Power Management I/O Request Packets (IRPs) directly. This creates an environment for device drivers that process framework interactions on behalf of the driver, allowing the driver to implement desired functionality while mitigating overall driver complexities. These features can be achieved by defining multiple state machines that manage PnP and Power-related events that in turn promote energy savings on a system-wide level.

As used in this application, the terms "component," "model," "system," "framework," "object," "stack," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
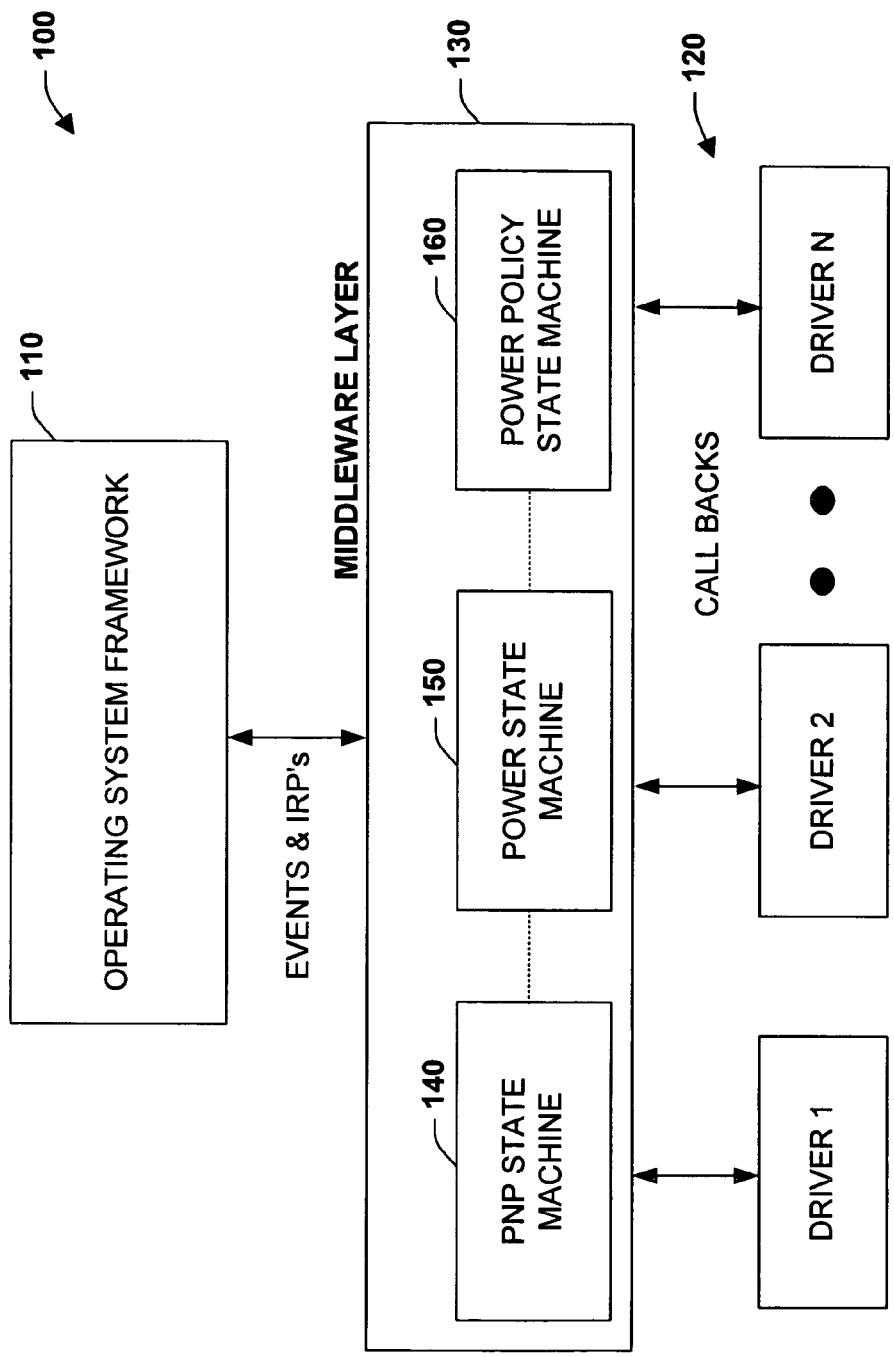
FIG. 1 is a schematic block diagram illustrating a power management system in accordance with an aspect of the present invention.

Referring initially to FIG. 1, a power management system 100 is illustrated in accordance with an aspect of the present invention. The system 100 includes an operating system framework 110 that interacts with one or more device drivers 120 via a middleware layer 130 that coordinates Plug and Play (PnP) requirements and power requirements between the framework and the drivers. In general, the middleware layer 130 includes one or more state machines or processing components that control and synchronize power operations for the system 100. The state machines include a PnP state machine 140 that tracks events from a PnP manager (not shown) while coordinating with a power state machine 150 that manages device power events and a power policy state machine 160 that manages system power events. The state machines are described in more detail below with respect to FIGS. 2-8.

By offloading power management considerations from the device driver level, and moving such processing to the middleware layer 130, several performance and design enhancements are achieved over conventional systems. One feature relates to simplifying the design of the drivers 120. For example, these drivers no longer have to attempt to account for system level considerations and can more simply respond to events, Interrupt Request Packets (IRPs), and call backs from the middleware layer 130 without substantial concern for coordination between other drivers and/or other components of the system 100. Moreover, since complex functional requirements are effectively transferred from the drivers 120 to the middleware layer 130, the drivers can be implemented as essentially "operating system-independent drivers." This implies that a driver in one operating system (e.g., Windows) can be easily transported and operated in another operating system (e.g., Linux) and vice versa.

Because of the flexibility and simplicity offered by the middleware layer 130, device drivers 120 can be put into low power states and returned to normal operating conditions in a straightforward and robust manner thus, conserving overall system power. As can be appreciated, the middleware layer 130 and state machines 140-160 can be implemented in various designs and can have all or portions thereof incorporated within the framework 110. Also, the drivers 120 can be designed for substantially any device such as network devices, memory devices (volatile or nonvolatile), acoustical devices, display devices, printers, bus devices, USB devices, infrared devices, power devices, keyboards, mice, and so forth. Furthermore, the state machines 140-160 can be implemented in substantially any language such as Unified Modeling Language (UML), Very High Speed Hardware Description Language (VHDL), programming languages such as C++ and so forth. In general, the following serve as general guidelines for the PnP, Power and framework components described herein:

1. Framework interaction with drivers should be opt-in.
2. Behavior should be well defined so that driver writers should be able to understand and predict behavior.
3. Behavior should be richly integrated with other parts of the Framework, so that a driver writer does not have to write substantial code to coordinate different parts of the Framework.
4. Behavior should be able to support complex as well as simple designs.
5. Default behavior should involve suitable "driver citizenship," supporting PnP Stop, Device Removal and Ejection (without a reboot,) Fast Resume, low run-time power usage, and device wakeup via external events, and so forth.
6. Framework-supplied behavior should be able to be overridden.

Figure 2:
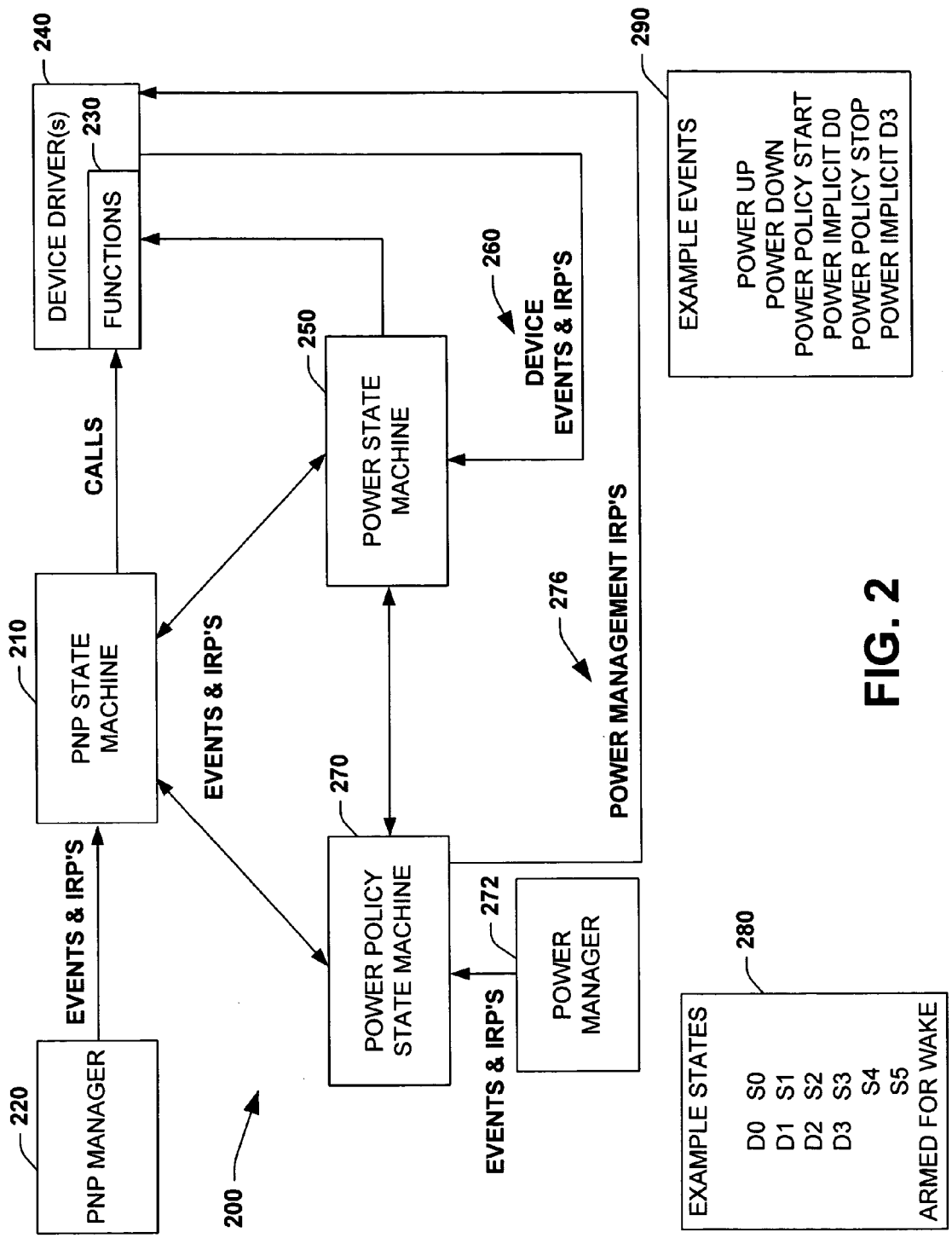
FIG. 2 is a schematic block diagram illustrating state machine interactions in accordance with an aspect of the present invention.

Referring now to FIG. 2, a system 200 illustrates state machine interactions in accordance with an aspect of the present invention. As noted above, three formal state machines can be defined however, more or less than three can be employed. A first state machine, referred to as the PnP State Machine 210, tracks PnP events or I/O Request Packets (IRPs) from a Plug and Play (PnP) manager 220. This machine responds by feeding events into other state machines and by calling PnP-related functions 230 supplied by a device driver 240, which fill in driver-specific behavior. A second state machine, referred to as the Power State Machine 250, tracks device Power Management events or IRPs at 260. This machine also manages device power states, by calling driver-supplied functions 230 where necessary.

A third state machine, referred to as the Power Policy State Machine 270, tracks system Power Management events or IRPs supplied by a system Power Manager 272. In one aspect, the Power Policy State Machine 270 manages tracking overall system state, along with device usage, deciding what power state the device should be in. The Power Policy Machine 270 sends device Power management IRPs at 276 that can become input events 260 for the Power State Machine 250. Generally, each of these state machines 210, 250, and 270 generate some events that are consumed by the other machines or other components. Together, they make up a larger system for implementing PnP and Power in the device driver 240 (or drivers). When the machines are integrated into a Driver Framework or operating system layer, they can be employed by a plurality of different device drivers, solving many problems such as system power consumption, driver complexity, and system robustness.

In general, the state machines can provide a plurality of different states that are entered into and/or exited from via one or more events. For example, various sample states are illustrated at 280 including system power states that are derived from the Advanced Configuration and Power Interface (ACPI) specification that is conventionally known and available from a plurality of sources such as the Internet. These states are generally defined as follows:

S0/working—The CPU is fully up and running, devices are powering up and down as needed.
S1—The CPU is stopped; RAM is refreshed; the system is running in a low power mode.
S2—The CPU has no power; RAM is refreshed; the system is in a lower power mode than S1.
S3—The CPU has no power; RAM is in slow refresh; the power supply is generally in a reduced power mode (for example, it can't supply much power and is running in a lower power efficiency mode).
S4—The hardware is completely off, system memory has been saved to disk.
S5/Off—the hardware is completely off, the operating system has shut down; nothing has been saved.

System power states are primarily defined in terms of motherboard/CPU/core logic characteristics and generally do not relate to individual devices themselves. Each device in the system generally has its own power states. These are defined as follows:

D0—fully on
D1—low power; context may be saved in hardware (depends on the device class)
D2—low power; context may be lost by hardware (depends on the device class)
D3—power may be lost; all context lost by hardware To enter and exit these and other states, one or more events can occur. In general, there are several classes of events, those that are universal to all operating systems since they are dictated by hardware, and those that may be specific to a particular type of operating system (e.g., Windows). Some example events are illustrated at 290 include: Power Up, Power Down, Power Policy Start, Power Policy Stop, Power Implicit D0, Power Implicit D3, and so forth.

Generally the state machines support a system that implements a general mechanism for all PnP, Device Power and Device Power Policy events. The system includes entry into states in one state machine that can cause transitions to occur in other state machines or components. In one example, entry into the D0 state causes a Power Up event to be sent to the other state machines since these machines may have been sent events that caused the device to start being used. This would result in an "ImplicitD0" event sent to the Power state machine which unifies the PnP and Power machines. The PnP state machine, however, waits until the Power state machine has completed the move into D0. In a multiprocessing operating system, components generally do not want to wait by sitting in a loop with the processor—these components suspend operations. Thus, the "Power Up" event alerts the PnP state machine and causes it to start running again, finishing the PnP operation.

Specific state processing implementation examples include, entry into a lower power state in the Power state machine causes a Power Down event to be fed into the Power Policy and the PnP state machines. In another case, entry into the D0 state in the Power state machine causes some or all of the I/O queues (not shown) in the driver (top-edge queues) to be released so that new requests can be processed.

As can be appreciated a plurality of state actions, events, IRP's, and processing can occur within or between state machines, drivers, and operating system components. Other examples of various actions include:

1. Entry into the D0 state in the Power state machine causes the device's interrupt to be enabled.

2. Entry into a lower or higher power state causes some or all of the I/O queues in the driver to be blocked, so that new requests can be held until some future time.
3. Entry into lower or higher power states causes the device's interrupt to be disabled.
4. Entry into various states causes a PowerPolicyStart event in the Power Policy state machine.
5. Entry into various states causes a PowerImplicitD0 event in the Power state machine.
6. Entry into various states causes a PowerPolicyStop event in the Power Policy state machine.
7. Entry into various states causes a PowerImplicitD3 event in the Power state machine.
8. Events that cause transitions in the PnP state machine include IRPs from the PnP Manager, a component external to the driver.
9. Events that cause transitions in the Power state machine include IRPs from the Power Policy state machine.
10. Events that cause transitions in the Power Policy state machine include IRPs from the Power Manager, a component external to the driver.

Figure 3:
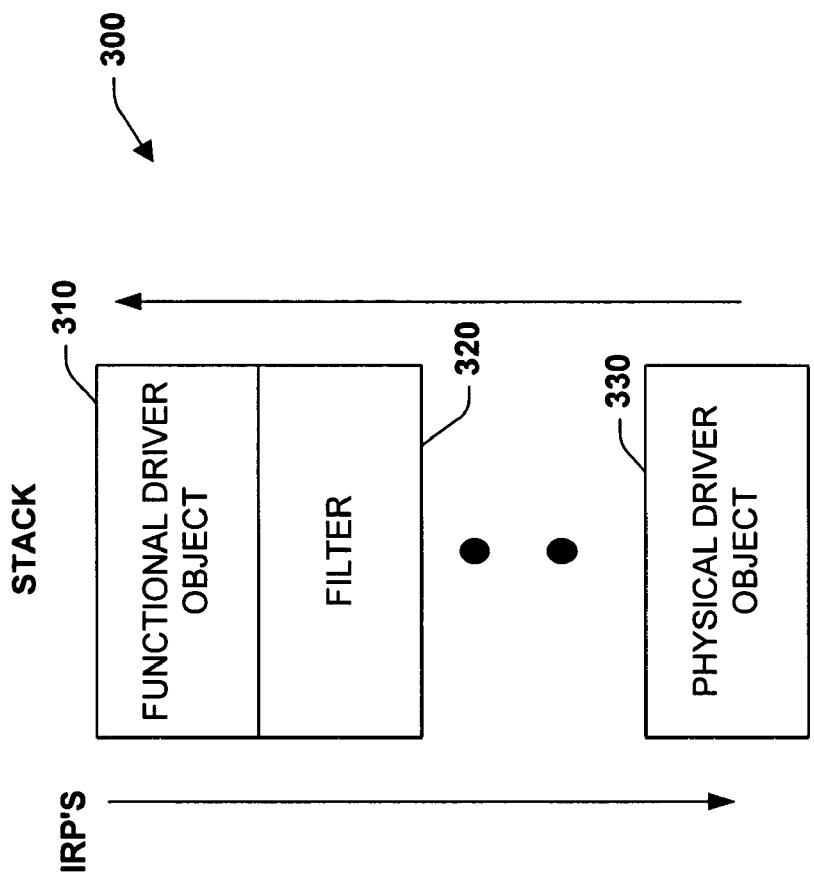
FIG. 3 is a diagram illustrating an exemplary stack in accordance with an aspect of the present invention.

Turning to FIG. 3, an exemplary processing stack 300 is illustrated in accordance with an aspect of the present invention. The stack 300 can include one or more stack objects. For example, the objects can include a Functional Driver Object (FDO) 310, a filter object 320 supplied by an operating system framework, and a Physical Driver Object (PDO) 330. As illustrated, IRP's can be propagated up or down the stack 300 for respective processing, wherein framework components or drivers can be driven and synchronized from a respective IRP.

It is noted that some operating systems or frameworks support the concept of driver stacking. For example, when an application opens up a handle to a "device," it controls the device by sending I/O Request Packets (IRPs) to the stack of drivers at 300. Generally, each of those drivers in the stack 300 may react to, modify or otherwise handle the IRPs that it observes. When one driver is finished with an IRP, it passes it down to the driver below it. There is also an opportunity for a driver to see an IRP after the driver below it has completed it as illustrated in FIG. 3. These type of stack actions are relevant since each physical device may have several drivers acting on it in some manner. Typically, at the least, there will be a "Functional Driver," or "FDO," and a "Physical Driver," or "PDO."

Generally, in each driver stack 300, each driver handles PnP and Power events. However, one driver in the stack should track system power events and status, deciding when the device should be powered on or off. Consequently, the PnP State Machine and the Power State machine can be instantiated in any device driver. The Power Policy State Machine should be instantiated in the driver that is the "power policy owner" for the device stack 300. Thus, the Power State Machine and the Power Policy State machine should exist or be implemented as separate entities or components. The following discussion describes various aspects of the state machines, events, IRP's, framework interactions, Application Programming Interfaces (APIs), and example system scenario's for which the state machines apply.

Referring now to FIG. 4, exemplary events 400 for a PNP state machine are illustrated in accordance with an aspect of the present invention. Before proceeding with a discussion of FIGS. 4-6, it is noted that the respective state machines can process more or less events (or other events) than the example events discussed in these Figures. Generally, the PNP state machine responds to the following external events 400:
1. AddDevice
2. IRP_MN_START_DEVICE
3. IRP_MN_START_DEVICE Complete
4. PowerUp—This event originates in the Power state machine
5. PowerDown—This event originates in the Power state machine.
6. IRP_MN_QUERY_REMOVE_DEVICE
7. IRP_MN_QUERY_STOP_DEVICE
8. IRP_MN_CANCEL_REMOVE_DEVICE
9. IRP_MN_CANCEL_STOP_DEVICE
10. IRP_MN_STOP_DEVICE
11. IRP_MN_REMOVE_DEVICE
12. IRP_MN_SURPRISE_REMOVE_DEVICE
13. IRP_MN_EJECT
14. ParentRemoved Turning to FIG. 5, exemplary events 500 for a Power state machine are illustrated in accordance with an aspect of the present invention. Generally, the Power state machine responds to the following external events 500:
1. IRP_MN_SET_POWER—Device Power
2. PowerImplicitD0—This event is generated in the Power Policy state machine.
3. PowerImplicitD3—This event is generated in the Power Policy state machine.
4. IRP_MN_WAIT_WAKE—Arrival at the PDO
5. IRP_MN_WAIT_WAKE—Complete—It is noted that this event originates in the driver calling the Framework API WdfDeviceCompleteWaitWakeRequest
6. IRP_MN_WAIT_WAKE—Succeeded
7. IRP_MN_WAIT_WAKE—Canceled
8. PowerPolicyStopRemove—This event is actually two events. PowerPolicyStopRemove [Normal] and PowerPolicyStopRemove [Surprise Removed]. Normal is sent during orderly shutdown, surprise removed is sent if the hardware was removed from the machine in a non-orderly manner. This event is generated in the PnP state machine.
9. MarkPowerNonPageable—This event is generated within the PnP code in the Framework, when the device gets a paging/hibernation/crash path notification.
10. MarkPowerPageable—See NonPageable above.
11. ParentMovingToD0—This event is generated within the parent's Power state machine.

Since there are generally fewer events that feed into the Power state machine, it is acceptable to look at side conditions when choosing a target state. Specifically, several transitions observe a POWER_STATE_TYPE. The Power state machine can be designed to process FDOs, PDOs, filters, bus filters and the like. It is valid whether or not the driver is also the power policy owner.

Figure 6:
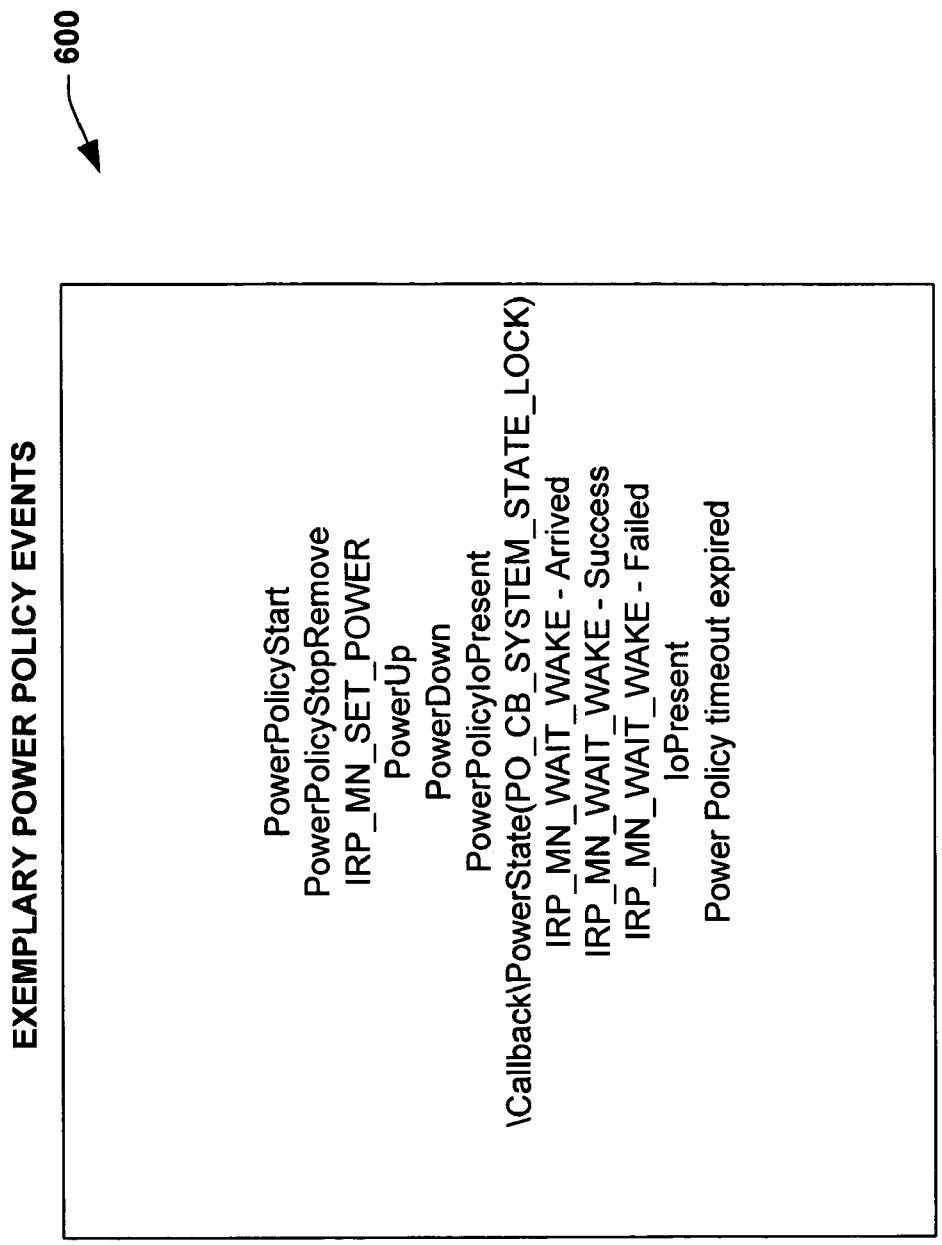
FIG. 6 illustrates exemplary events for a Power Policy state machine in accordance with an aspect of the present invention.

Referring to FIG. 6, exemplary events 600 for a Power Policy state machine are illustrated in accordance with an aspect of the present invention. Generally, the Power Policy state machine is instantiated when the driver decides to be the power policy owner for the stack. This will usually be true if the driver is an FDO. It will usually not be true otherwise. The Power Policy state machine is primarily responsible for deciding when the device should be in D0, D1, D2 or D3. It also decides whether the device should be armed for wakeup. The Power Policy state machine sends IRP_MN_SET_POWER IRPs to the stack that have D-state information in them. It also sends IRP_MN_WAIT_WAKE.

The Power Policy state machine responds to the following external events 600:
1. PowerPolicyStart—This event originates in the PnP state machine.
2. PowerPolicyStopRemove—This event is actually two events. PowerPolicyStopRemove [Normal] and Power- PolicyStopRemove [Surprise Removed]. Normal is sent during orderly shutdown, surprise removed is sent if the hardware was removed from the machine in a non-orderly manner. This event originates in the PnP state machine.

3. IRP_MN_SET_POWER—System power state.
4. PowerUp—This event originates in the Power state machine.
5. PowerDown—This event originates in the Power state machine.
6. PowerPolicyIoPresent—This event is triggered when the I/O Count is incremented, either by the Framework or by the driver itself.
7. \Callback\PowerState(PO_CB_SYSTEM_STATE_LOCK)—This event originates in the kernel power manager. It indicates that the system is changing from S0 to Sx or from Sx to S0, where Sx is any S state other than S0.
8. IRP_MN_WAIT_WAKE—Arrived.
9. IRP_MN_WAIT_WAKE—Success.
10. IRP_MN_WAIT_WAKE—Failed.
11. IoPresent—The driver explicitly states that there is I/O present that should be in D0.
12. Power Policy timeout expired—There has been no I/O for long enough that the device should be placed in a low power state.
13. S0 idle policy changed—This event is sent as a side affect of the driver calling WdfDeviceUpdateS0IdleSettings or if the user changes the setting (through a device management user interface).

The Power Policy state machine makes distinctions between waking from S0 and waking from S-not-0, noted as "Sx." The distinction is relevant, since many devices have different usage scenarios for waking from S0 and waking from Sx. Consider a few examples:

Mice—A mouse is generally used only to wake the machine. Very few current mice would be powered down in the S0 state, mostly because so many of them are optical, which means that they wouldn't wake when moved.

Keyboards—These are generally used only for waking from Sx, since current keyboard controllers don't preserve the keystroke that was used to trigger the wake event. This pretty much precludes S0keyboard power management.

NICs (Network Interface Cards)—While NICs may wake from both S0 and Sx, they may wake for different reasons. Waking from S0 is done when a cable is plugged in. Waking from Sx is done when a certain packet arrives, possibly with some filter applied. In Sx, it is probably not desired to have the machine wake when a cable is inserted. And in S0, it is probably not desirable to have the NIC leave D0 except when the cable is removed, which means that the packet-based wakeup is not relevant.

Microphone—It is probably not desirable to have a computer to wake when talking is detected. Drivers may want the microphone to be off in S0, though, except when talking is detected.

Floppy drive—It is desirable for a disk change notification to wake from S0, but not Sx.

Modem—Drivers may actually want the phone ringing to wake the modem regardless of S-state. This is one example where a distinction between S0 and Sx is likely not relevant.

For the above reasons, there can be separate callbacks related to Wait/Wake for S0 and Sx. A similar approach as the Power state machine could be taken to automatically register the same callbacks for the S0 and Sx cases. But, unlike the power situation, the common case here is different behavior for S0 and Sx, which implies that most drivers may end up overriding the default callbacks. Also, the Power Policy state machine is similar to the Power state machine in that some of its callbacks should be called under the constraint that they will not generate a page fault.

When the Power Policy state machine chooses to move the device out of D0, it selects between D1, D2 and D3. The device should be as deeply asleep as it can be without disabling functionality, both when the computer is remaining in S0 and when it is going to sleep. For the most part, latency differences between D1, D2 and D3 are not as relevant, as they tend to be on the order of milliseconds. The ACPI specification, and other available power management documents imply that the differences between D1, D2 and D3 mostly relate to wakeup latency. In practice, this has not been the case. There are, of course, some notable exceptions, (e.g., CRT monitors), but most devices have wakeup latencies that are mostly on the order of a few milliseconds.

Figure 7:
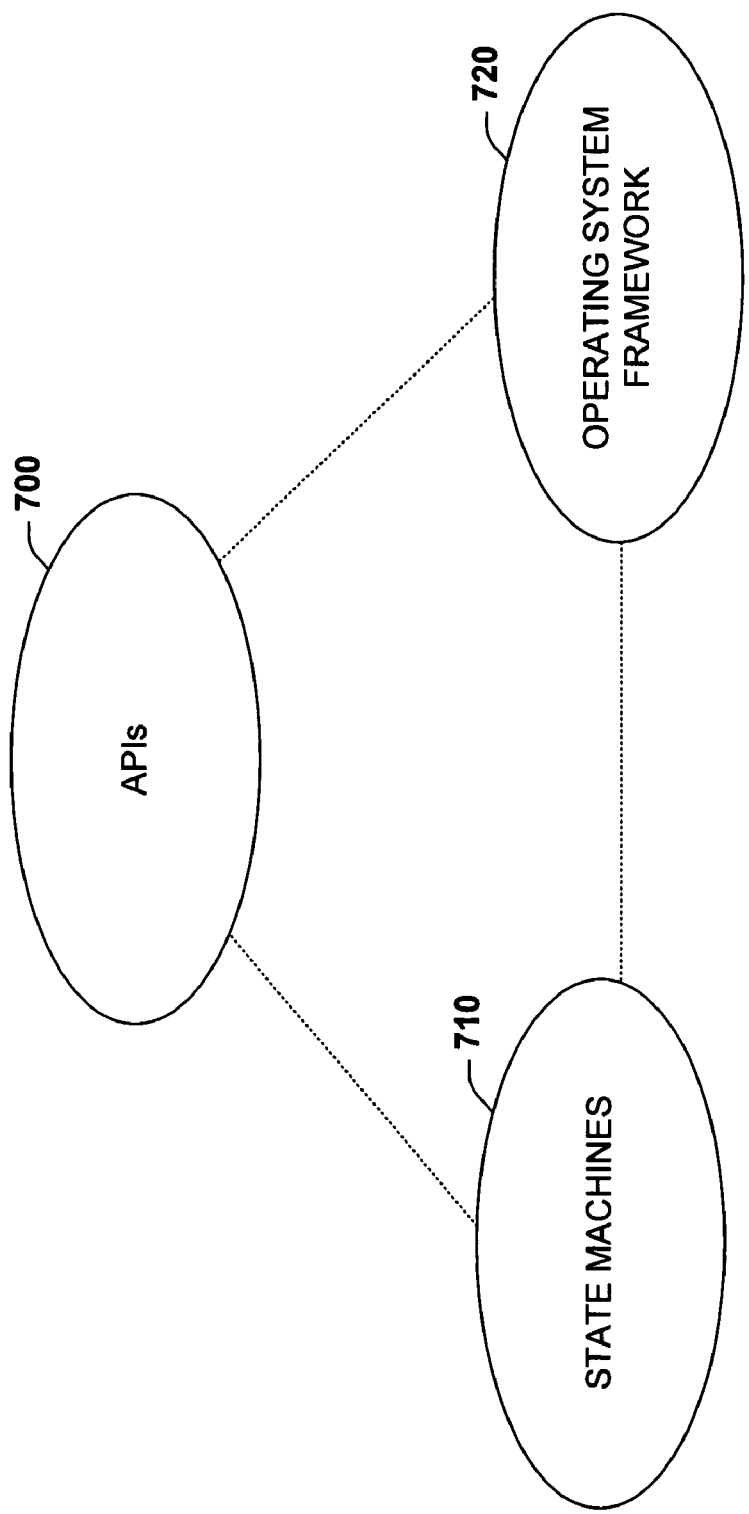
FIG. 7 illustrates Application Programming Interface interactions with state machines and an operating system framework in accordance with an aspect of the present invention.

FIG. 7 illustrates that one or more Application Programming Interfaces 700 (APIs) can be employed to interact with one or more state machines 710 and/or operating system framework adapted in accordance with the present invention. It is noted that the API descriptions that follow are exemplary in nature and that various other possible implementations are possible. The API's 700 are described as follows:

WDF Objects Relating to PnP/Power

WDFDEVICE

Framework Interfaces:

WdfDeviceInitSetPowerPolicyOwnership

```
VOID
WdfDeviceInitSetPowerPolicyOwnership(
    IN PWDFDEVICEINIT DeviceInit,
    IN BOOLEAN      Owner
    );
```

By default, the Framework assumes that any FDO is the power policy owner, and any filter or PDO is not. If this is not true, then the driver can call this function to deterministically mark the device as either an owner or a non-owner. The Framework can instantiate a Power Policy state machine and corresponding WDFPOWERPOLICY object for any device that owns the power policy for its stack.

WdfDeviceFailed

```
typedef enum _WDF_DEVICE_FAILED_ACTION {
    WdfDeviceFailedUndefined = 0,
    WdfDeviceFailedAttemptRestart,
    WdfDeviceFailedNoRestart,
} WDF_DEVICE_FAILED_ACTION;
VOID
WdfDeviceFailed(
    IN WDFDEVICE Device,
    IN WDF_DEVICE_FAILED_ACTION FailedAction
    );
```

If a driver calls this API, the device stack should be torn down. If the driver calls with WdfDeviceFailedAttemptRestart as the FaileDAction, then the Framework can attempt to cause the stack to be built up again. Either condition can cause the driver to experience a process such as a SurpriseRemove situation, for example.

It is expected that, for catastrophic software failures, the driver would set FailedAction to WdfDeviceFailedAttemptRestart and for catastrophic hardware failures, the driver would set FailedAction to WdfDeviceFailedNoRestart. If the hardware can be "fixed" by passing through a D3 uninitialized state, then a driver may specify TRUE for a hardware error.

WdfDeviceInitRegisterPnpStateChangeCallback,

WdfDeviceInitRegisterPowerStateChangeCallback,

WdfDeviceInitRegisterPowerPolicyStateChangeCallback

```
typedef enum_WDF_STATE_NOTIFICATION_TYPE {
    StateNotificationInvalid    =       0x0000,
    StateNotificationEnterState =       0x0001,
    StateNotificationPostProcessState = 0x0002,
    StateNotificationLeaveState =       0x0004,
    StateNotificationAllStates =        StateNotificationEnterState |
                                        StateNotificationPostProcessState |
                                        StateNotificationLeaveState
} WDF_STATE_NOTIFICATION_TYPE;
typedef struct_WDF_DEVICE_PNP_NOTIFICATION_DATA {
    //
    // Type of data
    //
    WDF_STATE_NOTIFICATION_TYPE Type;
    union {
        struct {
            //
            // The current state that is about to be exitted
            //
            WDF_DEVICE_PNP_STATE CurrentState;
            //
            // The new state that is about to be entered
            //
            WDF_DEVICE_PNP_STATE NewState;
        } EnterState;
        struct {
            //
            // The current state
            //
            WDF_DEVICE_PNP_STATE CurrentState;
        } PostProcessState;
        struct {
            //
            // The current state that is about to be exitted
            //
            WDF_DEVICE_PNP_STATE CurrentState;
            //
            // The state that is about to be entered
            //
            WDF_DEVICE_PNP_STATE NewState;
        } LeaveState;
    } Data;
} WDF_DEVICE_PNP_NOTIFICATION_DATA;
typedef const WDF_DEVICE_PNP_NOTIFICATION_DATA*
PCWDF_DEVICE_PNP_NOTIFICATION_DATA;
typedef struct_WDF_DEVICE_POWER_NOTIFICATION_DATA {
    //
    // Type of data
    //
    WDF_STATE_NOTIFICATION_TYPE Type;
    union {
        struct {
            //
            // The current state that is about to be exitted
            //
            WDF_DEVICE_POWER_STATE CurrentState;
            //
            // The new state that is about to be entered
            //
            WDF_DEVICE_POWER_STATE NewState;
        } EnterState;
        struct {
            //
            // The current state
            //
            WDF_DEVICE_POWER_STATE CurrentState;
        } PostProcessState;
        struct {
```

```
        //
        // The current state that is about to be exitted
        //
        WDF_DEVICE_POWER_STATE CurrentState;
        //
        // The state that is about to be entered
        //
        WDF_DEVICE_POWER_STATE NewState;
      } LeaveState;
    } Data;
} WDF_DEVICE_POWER_NOTIFICATION_DATA;
typedef const WDF_DEVICE_POWER_NOTIFICATION_DATA*
PCWDF_DEVICE_POWER_NOTIFICATION_DATA;
typedef struct _WDF_DEVICE_POWER_POLICY_NOTIFICATION_DATA {
  //
  // Type of data
  //
  WDF_STATE_NOTIFICATION_TYPE Type;
  union {
    struct {
      //
      // The current state that is about to be exitted
      //
      WDF_DEVICE_POWER_POLICY_STATE CurrentState;
      //
      // The new state that is about to be entered
      //
      WDF_DEVICE_POWER_POLICY_STATE NewState;
    } EnterState;
    struct {
      //
      // The current state
      //
      WDF_DEVICE_POWER_POLICY_STATE CurrentState;
    } PostProcessState;
    struct {
      //
      // The current state that is about to be exitted
      //
      WDF_DEVICE_POWER_POLICY_STATE CurrentState;
      //
      // The state that is about to be entered
      //
      WDF_DEVICE_POWER_POLICY_STATE NewState;
    } LeaveState;
  } Data;
} WDF_DEVICE_POWER_POLICY_NOTIFICATION_DATA;
typedef const WDF_DEVICE_POWER_POLICY_NOTIFICATION_DATA*
PCWDF_DEVICE_POWER_POLICY_NOTIFICATION_DATA;
typedef
VOID
(*PFN_WDF_DEVICE_PNP_STATE_CHANGE_NOTIFICATION)(
  WDFDEVICE Device,
  PCWDF_DEVICE_PNP_NOTIFICATION_DATA NotificationData
  );
typedef
VOID
(*PFN_WDF_DEVICE_POWER_STATE_CHANGE_NOTIFICATION)(
  WDFDEVICE Device,
  PCWDF_DEVICE_POWER_NOTIFICATION_DATA NotificationData
  );
typedef
VOID
(*PFN_WDF_DEVICE_POWER_POLICY_STATE_CHANGE_NOTIFICATION)(
  WDFDEVICE Device,
  PCWDF_DEVICE_POWER_POLICY_NOTIFICATION_DATA NotificationData
  );
WDFSTATUS
WdfDeviceInitRegisterPnpStateChangeCallback(
  PWDFDEVICE_INIT DeviceInit,
  WDF_DEVICE_PNP_STATE PnpState,
  PFN_WDF_DEVICE_PNP_STATE_CHANGE_NOTIFICATION EvtPnpStateChange,
  ULONG CallbackTypes
  );
WDFSTATUS
WdfDeviceInitRegisterPowerStateChangeCallback(
  PWDFDEVICE_INIT DeviceInit,
  WDF_DEVICE_POWER_STATE PowerState,
  PFN_WDF_DEVICE_POWER_STATE_CHANGE_NOTIFICATION
```

```
EvtPowerStateChange,
   ULONG CallbackTypes
   );
WDFSTATUS
WdfDeviceInitRegisterPowerPolicyStateChangeCallback(
   PWDFDEVICE_INIT DeviceInit,
   WDF_DEVICE_POWER_POLICY_STATE PowerPolicyState,
   PFN_WDF_DEVICE_POWER_POLICY_STATE_CHANGE_NOTIFICATION
EvtPowerPolicyStateChange,
   ULONG CallbackTypes
   );
```

In general, the Framework may not provide callbacks for every state in its state machines, however, the driver can register for states that it wants to access. The above functions provide that capability.

Typically, the driver writer can register for three types of state change notifications such as:
1. StateNotificationEnterState: Notification of when the state is about to be entered. This callback should be called before the framework processes the new state. The callback should be given the state about to be entered and the state being exited.
2. StateNotificationPostProcessState: Notification after a new state has been processed by the framework. The callback should be given the state that has just been processed.
3. StateNotificationLeaveState: Notification of when the state is about to be exited. The callback should be given the state about to be exited and the new state.

These state machine related callbacks above generally do not replace formal event callbacks that a driver can register for using conventional registration APIs. For instance, if the driver registered for a state change notification on a RestartingSelfManagedIostate, it would not replace the EvtDeviceSelfManagedIoRestart callback related to this state.

WdfDeviceSetStaticStopRemove

```
NTSTATUS
WdfDeviceSetStaticStopRemove(
   IN WDFDEVICE Device
   IN BOOLEAN Stoppable
   );
```

This function sets a property on a device. If TRUE, the Framework should allow a Stop or Remove of the device. If FALSE, it should not. The default is TRUE. A driver may change the setting. This function is generally intended for devices which must not stop their respective queues. They can inform the Framework, in advance, that their driver should run without substantial interruption.

Event Callbacks:

EvtDeviceD0Entry

```
typedef enum _WDF_DEVICE_POWER_STATE {
   WdfPowerDeviceUnspecified = 0,
   WdfPowerDeviceD0,
   WdfPowerDeviceD1,
   WdfPowerDeviceD2,
   WdfPowerDeviceD3,
   WdfPowerDeviceD3Final,
   WdfPowerDevicePrepareForHibernation,
   WdfPowerDeviceMaximum
} WDF_DEVICE_POWER_STATE,
*PWDF_DEVICE_POWER_STATE;
NTSTATUS
EvtDeviceD0Entry(
   IN WDFDEVICE Device,
   IN WDF_DEVICE_POWER_STATE PreviousState
   );
```

This callback is invoked when the Power state machine enters the D0 state.

The driver then performs desired normal operations when power is first applied to the device. This may include downloading firmware to the device, unmasking internal interrupt sources, and so forth. Since the Framework takes care of unblocking queues and other aspects, the driver should generally perform hardware-related operations in this callback.

PreviousState can indicate the state that the device was most recently in, which may be useful when waking. If the device was previously unstarted, it likely had no valid D-state, so PreviousState should be WdfPowerDeviceUnspecified. This can be called when the device gets an IRP_MN_START_DEVICE or IRP_MN_SET_POWER-D0, for example.

EvtDeviceD0Exit

```
NTSTATUS
EvtDeviceD0Exit(
   IN WDFDEVICE Device,
   IN WDF_DEVICE_POWER_STATE TargetState
   );
```

This callback is invoked when the Power state machine enters a Dx state where 0<x<=3. Note that the Power state machine can transition to this state before the actual Dx IRP passes through to the PDO. (Or, if this driver is the PDO, before power is removed.) This facilitates that the driver can still interact with hardware in this callback. The driver performs operations which should be performed when power is about to be removed. This may involve saving some register state, masking internal interrupt sources, and so forth.

If the TargetState is WdfPowerDeviceD3Final, the device is being stopped or removed. If the driver needs to perform any actions on the device that will assume the device will not return to D0, they should be performed here.

TargetState should only be WdfPowerDevicePrepareForHibernation if the device is on the hibernation path (e.g., it got IRP_MN_DEVICE_USAGE_NOTIFICATION—Hibernation) and the target S-state is S4.

If the TargetState is WdfPowerDevicePrepareForHibernation, the driver should perform suitable operations to quiet the device without shutting it off. It should also gather states that may be necessary for putting the device back in D0 after the system resumes from hibernation. It is noted that the device should not be powered off, since this device may be used to save the hibernation file to disk. This callback can be called when the device gets IRP_MN_STOP_DEVICE, IRP_MN_REMOVE_DEVICE or IRP_MN_SET_POWER-Dx.

EvtDevicePrepareHardware

```
NTSTATUS
EvtDevicePrepareHardware(
    IN WDFDEVICE Device,
    IN WDFCOLLECTION ResourcesRaw,
    IN WDFCOLLECTION ResourcesTranslated
    );
```

This callback is invoked when the device is assigned a new set of PnP resources. The driver should take note of them, and possibly map them, using them for device control routines. This is also a place to call USB-related functions that have to wait until the device has gotten a Start command. Examples of these USB functions are:
- WdfUsbDeviceGetDeviceDescriptor
- WdfUsbDeviceGetConfigDescriptor
- WdfUsbDeviceGetInterfaceNumberByIndex
- WdfUsbDeviceGetInterfacePipesCollection
- WdfUsbDeviceGetNumInterfaces
- WdfUsbDeviceSelectConfig If the driver returns failure, the stack should be torn down. While the hardware is available and the driver may access it in this state, it is probably more suitable for the driver to wait for EvtDeviceD0Entry before access the hardware. Exceptions include operations that involve finding out exactly which version of the hardware is actually present.

EvtDeviceContextCleanup

```
VOID
EvtDeviceContextCleanup(
    IN WDFDEVICE Device
    );
```

This callback is invoked when a device is being removed. Hardware is no longer accessible at this point. There should be no outstanding I/O—it should have been flushed and the queues should be canceling operations by this point. The driver should be concerned with freeing memory, tearing down structures and cleaning up software states, for example at this point. The driver should not access hardware in this callback.

EvtDeviceSelfManagedIoCleanup

```
VOID
EvtDeviceSelfManagedIoCleanup(
    IN WDFDEVICE Device
    );
```

This callback is invoked after the driver has stopped driver operations that are not being managed by the Framework. It is invoked on Remove and Surprise Remove. The driver should perform outstanding cleanup work. The driver should not access hardware during this callback.

EvtDeviceSelfManagedIoInit

```
NTSTATUS
EvtDeviceSelfManagedIoInit(
    IN WDFDEVICE Device
    );
```

This callback is invoked when the driver should start operations that are not being managed by the Framework. This callback should be the first in the "SelfManagedIo" group invoked as the driver starts. It should be invoked once when the device is started.

If a driver fails this callback, the Framework should inform the PnP manager that the device has failed, which should cause the PnP manager to tear the stack down. EvtDeviceSelfManagedIoCleanup will be called if failure is returned from this function.

EvtDeviceSelfManagedIoSuspend

```
NTSTATUS
EvtDeviceSelfManagedIoSuspend(
    IN WDFDEVICE Device
    );
```

This callback is invoked when the driver should pause operations that are not being managed by the Framework. It should be invoked on Dx transitions, except when EvtDeviceSelfManagedIoStop has been called but EvtDeviceSelfManagedIoRestart has not. This callback differs from EvtDeviceSelfManagedIoStop in that failure should be interpreted as fatal, causing the stack to be torn down. Hardware may be available while this callback is invoked. If the device is surprise removed while it is in the D0 state, this function will be called when hardware is not available.

EvtDeviceSelfManagedIoRestart

```
NTSTATUS
EvtDeviceSelfManagedIoRestart(
    IN WDFDEVICE Device
    );
```

This callback is invoked when the driver should resume operations that are not being managed by the Framework. It should be invoked after EvtDeviceSelfManagedIoSuspend or EvtDeviceSelfManagedIoStop was invoked. Hardware is available while this callback is invoked.

EvtDeviceSelfManagedIoStop

```
WDFSTATUS
EvtDeviceSelfManagedIoStop(
    IN WDFDEVICE Device
    );
```

WDF_STATUS_CANNOT_STOP—Indicates that the driver successfully determined that the device can't be stopped at the moment.

This callback is invoked when the driver should stop queues that are not being managed by the Framework, since the device is being stopped, in response to IRP_MN_QUERY_STOP or IRP_MN_QUERY_REMOVE. This should occur before the Framework stops Framework-managed queues, which is before the device exits the D0 state. If a driver fails this callback, the Framework should fail the IRPs. This is intended to be a valid way to indicate that temporal conditions exist wherein the driver cannot be stopped or removed. Hardware is available while this callback is invoked.

EvtDeviceSurpriseRemoval

```
VOID
EvtDeviceSurpriseRemoval(
    IN WDFDEVICE Device
    );
```

This callback is invoked when the device is pulled out of the system—physically or logically. This is largely informational, as the Framework can still process queues, and the callback EvtDeviceRemove should be invoked later. It is expected that, if drivers register for this callback, they will use it for reporting specific error conditions. Hardware is not available while this callback runs.

EvtDeviceReleaseHardware

```
NTSTATUS
EvtDeviceReleaseHardware(
    IN WDFDEVICE Device,
    IN WDFCOLLECTION ResourcesTranslated
    );
```

This callback is invoked when the device is losing ownership of its PnP resources, and the driver should un-map items that it has previously mapped. If the driver returns failure, then the stack should be torn down. The driver may not access hardware during this callback. The device has already been moved into the D3 state.

Pnp State Machine Input Events:

PnpEventAddDevice

This event is generated from the driver's PnP AddDevice routine. This event is pertinent to FDOs.

PnpEventStartDevice

This event is generated when the device has initially received an IRP_MN_START_DEVICE request. The event is sent before the request itself is sent down the device stack if the device is an FDO or completed immediately if the device is a PDO. The IRP at this point is neither queued nor pended.

PnpEventStartDeviceComplete

This event is generated when the device has sent the IRP_MN_START_DEVICE request down the stack and it has been completed successfully. Before sending the event, the IRP is queued and pended. If the device generating this event is a PDO, this event is generated after the PnpEventStartDevice event without further IRP processing. Upon completion of processing this event, the state machine will complete the start request up the stack.

PnpEventQueryRemove

This event is generated when the device receives the IRP_MN_QUERY_REMOVE_DEVICE request. Before sending the event, the IRP will be queued and pended. Upon completion of processing this event, the IRP will be processed accordingly. If the event was processed successfully, the IRP will be sent down the stack if the device is an FDO or completed immediately if the device is a PDO. If the event was processed unsuccessfully, the IRP will be completed immediately with error.

PnpEventQueryStop

This event is generated when the device receives the IRP_MN_QUERY_STOP_DEVICE request. Before sending the event, the IRP will be queued and pended. Upon completion of processing this event, the IRP will be processed accordingly. If the event was processed successfully, the IRP will be sent down the stack if the device is an FDO or completed immediately if the device is a PDO. If the event was processed unsuccessfully, the IRP will be completed with error.

PnpEventCancelRemove

This event is generated when the device receives the IRP_MN_CANCEL_REMOVE_DEVICE request. Before sending the event, the IRP will be queued and pended. Upon completion of processing this event, the IRP will be sent down the stack if the device is an FDO or completed immediately if the device is a PDO.

PnpEventCancelStop

This event is generated when the device receives the IRP_MN_CANCEL_STOP_DEVICE request. Before sending the event, the IRP will be queued and pended. Upon completion of processing this event, the IRP will be sent down the stack if the device is an FDO or completed immediately if the device is a PDO.

PnpEventStop

This event is generated when the device receives the IRP_MN_STOP_DEVICE request. Before sending the event, the IRP will be queued and pended. Upon completion of processing this event, the IRP will be sent down the stack if the device is an FDO or completed immediately if the device is a PDO.

PnpEventRemove

This event is generated when the device receives the IRP_MN_REMOVE_DEVICE request. Before sending the event, the IRP will be queued and pended. Upon completion of processing this event, the IRP will be sent down the stack if the device is an FDO or completed immediately if the device is a PDO.

PnpEventSurpriseRemove

This event is generated when the device receives the IRP_MN_SURPRISE_REMOVAL request. Before sending the event, the IRP will be queued and pended. Upon completion of processing this event, the IRP will be sent down the stack if the device is an FDO or completed immediately if the device is a PDO.

PnpEventEject

This event is generated when the PDO receives the IRP_MN_EJECT request. Before sending the event, the IRP will be queued and pended. Upon completion of processing this event, the IRP will be sent down the stack if the device is an FDO or completed immediately if the device is a PDO.

PnpEventPowerUp

This event is generated by the power state machine to indicate that the device has returned to D0, either implicitly or explicitly. This event may have been in response to a power up request made by the pnp state machine to power up the device.

PnpEventPowerDown

This event is generated by the power state machine to indicate that the device been put into a Dx state, either implicitly or explicitly. This event may have been in response to a power up request made by the pnp state machine to power down the device.

PnpEventPowerUpFailed

This event is generated by the power state machine to indicate that a request for the device to return to D0 has failed. Reception of this event will lead to the device stack being torn down.

PnpEventPowerDownFailed

This event is generated by the power state machine to indicate that a request for the device to go into a Dx state has failed. Reception of this event will lead to the device stack being torn down PnpEventParentRemoved This event is sent by the parent PnP state machine to all of its enumerated children that are still present. This event is sent when the parent is being removed from the system. The parent will wait for each child to send a PnpEventChildrenRemovalComplete event to it before finishing processing of the PnpEventRemove event. The PnpEventChildrenRemovalComplete event is sent by the child PnP state machine to its parent when it has been successfully removed.

Power Policy Interfaces

WdfDeviceUpdateS0IdleSettings

```
typedef enum _WDF_POWER_POLICY_S0_IDLE_CAPABILITIES {
    IdleCapsInvalid = 0,
    IdleCannotWakeFromS0,
    IdleCanWakeFromS0,
} WDF_POWER_POLICY_S0_IDLE_CAPABILITIES;
typedef enum _WDF_POWER_POLICY_S0_IDLE_USER_CONTROL {
    IdleUserControlInvalid = 0,
    IdleDoNotAllowUserControl,
    IdleAllowUserControl,
} WDF_POWER_POLICY_S0_IDLE_USER_CONTROL;
typedef struct _WDF_DEVICE_POWER_POLICY_IDLE_SETTINGS {
    //
    // Size of this structure in bytes
    //
    ULONG Size;
    //
    // Indicates whether the device can wake itself up while the machine is in
    // S0.
    //
    // This value is only read the first time WdfDeviceUpdateS0IdleSettings is
    // called.
    //
    WDF_POWER_POLICY_S0_IDLE_CAPABILITIES IdleCaps;
    //
    // The low power state in which the device will be placed when it is idled
    // out while the machine is in S0.
    //
    DEVICE_POWER_STATE DxState;
    //
    // Amount of time the device must be idle before idling out. Timeout is in
    // milliseconds.
    //
    ULONG IdleTimeout;
    //
    // Inidcates whether a user can control the idle policy of the device.
    // By default, a user is allowed to change the policy.
    //
    // This value is only read the first time WdfDeviceUpdateS0IdleSettings is
    // called.
    //
    WDF_POWER_POLICY_S0_IDLE_USER_CONTROL UserControlOfIdleSettings;
    //
    // If TRUE, idling out while the machine is in S0 will be enabled.
    // If FALSE, idling out will be disabled.
    //
    WDF_TRI_STATE Enabled;
} WDF_DEVICE_POWER_POLICY_IDLE_SETTINGS,
*PWDF_DEVICE_POWER_POLICY_IDLE_SETTINGS;
WDFSTATUS
WdfDeviceUpdateS0IdleSettings(
    WDFDEVICE Device,
    PWDF_DEVICE_POWER_POLICY_IDLE_SETTINGS Settings
    );
```

This function specifies the S0 idle capabilities and associated settings of the device. The function allows the driver writer to specify the following:

1. Whether the device can wake itself up while the machine is in the working (S0) state or not as indicated by the IdleCaps field.
   a. If it can wake the machine from S0, the field is set to IdleCanWakeFromS0 and a wait wake IRP is sent to the PDO when the device has idled out. The device signaling wake, the arrival of a power managed request, a call to WdfDevicePowerReference, or a change in the S0 idle policy can bring the device back into the D0 state.
   b. If it cannot wake from S0, the field is set to IdleCannotWakeFromS0 and no wait wake IRP is sent down the stack when the device has idled out. The arrival of a power managed request, a call to WdfEDevicePowerReference, or a change in the S0 idle policy can bring the device back into the D0 state.
2. The Dx state to put the device into when it has idled out. If PowerDeviceMaximum is specified, the Framework will use DEVICE_CAPABILITIES.DeviceWake of the device to determine the state to put the idled device into. If any other state is specified, that state will be used when the device has been idled
3. The amount of time to wait before determining that the device has idled out. If zero is specified, a default of 5 seconds is used.
4. The ability for the user to control the S0 idle policy of the device. If IdleAllowUserControl is specified, the Framework will register the WMI GUID GUID_POWER_DEVICE_ENABLE on behalf of the device which will expose the appropriate UI in device manager. This field is inspected the first time this API is called, it is ignored upon subsequent calls to the API
5. The enabled state of the S0 idle policy. If WdfDefault is specified and user control is allowed, the user's settings for S0 idle policy will be applied. If the user has never modified the S0 policy, it is defaulted to TRUE. If WdfDefault is specified and user control is not allowed, the policy is enabled. If WdfFalse is specified, the S0 idle policy is disabled and the device will not idle out while the machine is in S0. If WdfTrue is specified, the S0 idle policy is enabled.

WdfDevicePowerReference

```
VOID
WdfDevicePowerReference(
    IN WDFDEVICE Device,
    IN BOOLEAN WaitForD0
    );
```

This function is called by the driver or a Framework component to indicate that the device has I/O to process. If the count changes from 0 to non-zero, and if the device is in a low-power state, then the Power Policy state machine may send IRP_MN_SET_POWER-D0 in order to bring the device into the working state, so that it can handle the I/O requests. If WaitForD0 is TRUE, the device will be in D0 when the function returns to the caller. If FALSE is specified, the device will be brought back into the D0 state asynchronously.

WdfDevicePowerDereference

```
VOID
WdfDevicePowerDereference(
    IN WDFDEVICE Device
    );
```

This function is called by the driver or a Framework component to indicate that the I/O referred to by a previous call to WdfDevicePowerReference is complete. When the total count of outstanding I/O drops to 0, it causes an event to be fed into the Power Policy state machine, possibly causing it to send IRP_MN_SET_POWER-Dx, so that the device moves into a low-power state.

WdfDeviceUpdateSxWakeSettings

```
typedef enum _WDF_POWER_POLICY_SX_WAKE_USER_CONTROL {
    WakeUserControlInvalid = 0,
    WakeDoNotAllowUserControl,
    WakeAllowUserControl,
} WDF_POWER_POLICY_SX_WAKE_USER_CONTROL;
typedef struct _WDF_DEVICE_POWER_POLICY_WAKE_SETTINGS {
    //
    // Size of this structure in bytes
    //
    ULONG Size;
    //
    // The low power state in which the device will be placed when it is
    // armed for wake from Sx.
    //
    DEVICE_POWER_STATE DxState;
    //
    // Inidcates whether a user can control the idle policy of the device.
    // By default, a user is allowed to change the policy.
    //
    // This value is only read the first time WdfDeviceUpdateS0IdleSettings
    // is called.
    //
    WDF_POWER_POLICY_SX_WAKE_USER_CONTROL UserControlOfWakeSettings;
    //
    // If TRUE, arming for wake while the machine is asleep will be
    enabled.
    // If FALSE, arming will be disabled.
    //
    WDF_TRI_STATE Enabled;
} WDF_DEVICE_POWER_POLICY_WAKE_SETTINGS,
 *PWDF_DEVICE_POWER_POLICY_WAKE_SETTINGS;
WDFSTATUS
WdfDeviceUpdateSxWakeSettings(
    WDFDEVICE Device,
    PWDF_DEVICE_POWER_POLICY_WAKE_SETTINGS Settings
    );
```

This function specifies the wake from Sx capabilities and associated settings of the device. The function allows the driver writer to specify the following:

1. The Dx state to put the device into when the device armed to wake the machine from Sx. If PowerDeviceMaximum is specified, the framework will use DEVICE_CAPABILITIES.DeviceWake of the device to determine the state to put the device into. If any other state is specified, that state will be used when the device has been idled
2. The ability for the user to control the Sx wake policy of the device. If IdleAllowUserControl is specified, the Framework will register the WMI GUID GUID_POWER_DEVICE_WAKE_ENABLE on behalf of the device which will expose the appropriate UI in device manager. This field is inspected the first time this API is called, it is ignored upon subsequent calls to the API 3. The enabled state of the S0 idle policy. If WdfDefault is specified and user control is allowed, the user's settings for S0 idle policy will be applied. If the user has not modified the wake from Sx policy, it is defaulted to TRUE. If WdfDefault is specified and user control is not allowed, the policy is enabled. If WdfFalse is specified, the wake from Sx policy is disabled and the device will not be armed to wake the machine when it is in Sx. If WdfTrue is specified, the wake from Sx policy is enabled.

Power Policy State Machine Input Events:

PwrPolStart

This event is sent by the PnP state machine when the power policy state machine needs to be start. This start will be from the created or stopped [Normal] state. The PnP state machine sends this event after it has successfully processed the PnpEventStartDeviceCompleted event and while processing a PnpEventCancelStop from the query stopped state.

PwrPolStopRemove [Normal]

This event is sent by the PnP state machine when the power policy state machine is to stopped. This event will be sent when PnP state machine receives an IRP_MN_QUERY_STOP_DEVICE or IRP_MN_QUERY_REMOVE_DEVICE request. In response to this event, the power policy state machine will disarm the device if armed for wake from S0. Upon completion of processing of this event, the power policy owner and the non owner state machines will send a PowerImplicitD3 event to the power state machine.

PwrPolSystemStateLockIntoSx

This event is generated by the operating system when it is notifying system components that the machine is about to enter a lower power state. If the device has idled out and is in a low device (Dx) state, the power policy state machine will attempt to bring the device back into D0 so that the device can be put into the correct Dx state for the new system state. This event differs from the PwrPolSx even in that the transition to a lower system power state can fail at this point. When a PwrPolSx event is generated, the transition to a low system power state is not reversible.

PwrPolSystemStateLockReturnToS0

This event is generated by the operating system when the system has returned from a lower system power state (Sx) or an attempt to enter a lower system power state has failed. The power policy state machine will put the device back into a power policy started state.

PwrPolSx

This event is generated when the device receives an IRP_MN_SET_POWER [SystemPowerState] that is not for the PowerSystemWorking state. In response to this event, the power policy state machine will decide what the appropriate Dx state the device should be put into and if the device should be armed to wake the machine from the state from which the machine is going into.

PwrPolS0

This event is generated when the device receives an IRP_MN_SET_POWER [SystemPowerState] that is for the PowerSystemWorking state. In response to this event, the power policy state machine can bring the device back into the D0 state or keep it in the Dx state if it was not armed for wake from Sx and the device is enabled for idle with out wake and is currently idle.

PwrPolPowerDown

This event is generated by the power state machine when the device has been moved into a Dx state. This event is used as the synchronization mechanism between the power and power policy state machines between the actual request of the Dx IRP and the completion of the transition into that state.

PwrPolPowerUp

This event is generated by the power state machine when the device has been moved into a D0 state. This event is used as the synchronization mechanism between the power and power policy state machines between the actual request of the D0 IRP and the completion of the transition into that state.

PwrPolWakeArrived

This event is generated when the device receives an IRP_MN_WAIT_WAKE request. In response to this event, the power policy state machine will invoke the EvtDeviceArmWakeFromS0 or EvtDeviceArmWakeFromSx event callback, depending on the current state of the state machine.

PwrPolWakeSuccess

This event is generated by the device when an IRP_MN_WAIT_WAKE request is completed successfully by the wait wake owner of the stack. In response to this event, the power policy state machine make invoke the EvtDeviceWakeFromS0Triggered or EvtDeviceWakeFromSxTriggered event callback, depending on the current state of the state machine.

PwrPolWakeFailed

This event is generated by the device when an IRP_MN_WAIT_WAKE request is completed unsuccessfully by the wait wake owner of the stack. In response to this event, the power policy state machine will invoke either the EvtDeviceDisarmWakeFromS0 or EvtDeviceDisarmWakeFromSx event callbacks to undo the arming performed in EvtDeviceArmWakeFromS0 or EvtDeviceArmWakeFromSx.

PwrPolIoPresent

This event is generated by the device when the device has idled out into a Dx state and there is a need to bring the device back into D0. For instance, this need may be the arrival of a request into a power managed queue or the driver calling WdfDevicePowerReference. In response to this event, the power policy state machine may bring the device back into the D0 state, disarming it from wake if it had been previously armed.

PwrPolPowerTimeoutExpired

This callback is invoked when the device has triggered its wake signal from Sx. The Framework should process the aspects of wake, including moving the device back into D0, the system back into S0, restarting I/O queues, and so forth. Thus, the driver probably does not have to register for this. It's mostly informational.

PwrPolS0IdlePolicyChanged

This event is generated when the device either receives a WMI request to change the S0 idle policy or the driver has called WdfDeviceUpdateS0IdleSettings. In response to this event, the power policy state machine may bring the device back into D0, disable the idle timer, and put the device into the new power policy state as specified by the event source.

PwrPolSurpriseRemove [Surprise Removed]

This event is sent by the PnP state machine when the device receives an IRP_MN_SURPRISE_REMOVAL request. In response to this event, the power policy state machine will not invoke any driver event callbacks which may touch hardware. Upon completion of processing of this event, the power policy owner and the non owner state machines will send a PowerImplicitD3 event to the power state machine.

Callbacks:

EvtDeviceWakeArmS0

```
NTSTATUS
EvtDeviceArmWakeFromS0(
    IN WDFDEVICE Device
    );
```

This callback is invoked when the driver should arm its device to wake from S0. Note that this does not include setting the bits in the PCI Power Management Capability structure. The PCI driver should perform that function. A driver should register for this callback if it needs to do additional operations, such as reconfiguration of internal interrupt signals, to wake, for example.

EvtDeviceWakeDisarmS0

```
VOID
EvtDeviceDisarmWakeFromS0(
    IN WDFDEVICE Device
    );
```

This callback is invoked when the driver should disarm internal wake sources. This does not include setting bits in the PCI Power Management Capability structure. The driver generally only needs to undo operations it performed in EvtDeviceWakeArm.

EvtDeviceWakeFromS0Triggered

```
VOID
EvtDeviceWakeFromS0Triggered(
    IN WDFDEVICE Device
    );
```

This callback is invoked when the device has triggered its wake signal from S0. The Framework will handle the components of wake, including moving the device back into D0, restarting I/O queues, and so forth. Thus the driver probably does not have to register for this. It's mostly informational.

EvtDeviceWakeArmSx

```
NTSTATUS
EvtDeviceArmWakeFromSx(
    IN WDFDEVICE Device
    );
```

This callback is invoked when the driver should arm its device to wake from Sx. Note that this does not include setting the bits in the PCI Power Management Capability structure. The PCI driver should perform that function. A driver should register for this callback if it needs to perform additional operations, such as reconfiguration of internal interrupt signals, to wake, for example.

EvtDeviceWakeDisarmSx

```
VOID
EvtDeviceDisarmArmFromSx(
    IN WDFDEVICE Device
    );
```

This callback is invoked when the driver should disarm internal wake sources. Again, this should not include setting bits in the PCI Power Management Capability structure. The driver performs "undo" top operations performed in EvtDeviceWakeArm.

EvtDeviceWakeFromSxTriggered

```
VOID
EvtDeviceWakeFromSxTriggered(
    IN WDFDEVICE Device
    );
```

This callback is invoked when the device has triggered its wake signal from Sx. The Framework should process the aspects of wake, including moving the device back into D0, the system back into S0, restarting I/O queues, and so forth. This function is not guaranteed to be called if the device has actually triggered wake because there is an inherent race condition between the system power notification arriving to the device and the wake notification completing from the bus below it. Thus the driver probably does not have to register for this. It's mostly informational.

Power State Machine Input Events:

PowerD0

This event is sent by the device when it receives an IRP_MN_SET_POWER [DevicePowerState/PowerDeviceD0] request. In response to this event, the power state machine will bring the device into the D0 state, calling the appropriate callbacks to restore the device's state. Upon successful processing of this event, the power state machine sends a PnpEventPowerUp event to the PnP state machine and a PwrPolPowerUp event to the power policy state machine Upon failure to process this event, the power state machine will send a PnpEventPowerDownUp event to the PnP state machine.

PowerDx

This event is sent by the device when it receives an IRP_MN_SET_POWER [DevicePowerState/PowerDeviceDx] request. In response to this event, the power state machine will put the device into the Dx state, calling the appropriate callbacks to save the device's state. Upon successful processing of this event, the power state machine will send a PnpEventPowerDown event to the PnP state machine and a PwrPolPowerDown event to the power policy state machine Upon failure to process this event, the power state machine will send a PnpEventPowerDownFailed event to the PnP state machine.

PowerWakeArrival

When device is the wait wake owner for the stack, this event is sent by the device when it receives an IRP_MN_WAIT_WAKE request. Before sending this event, the wake request is pended. In response to this event, the EvtDeviceEnableWakeAtBus event callback may be invoked.

PowerWakeSucceeded

This event is sent when the driver calls the WdfDeviceCompleteWaitWakeRequest API with a successful NTSTATUS value and the device is currently armed for wake at the bus level. In response to this event, the power state machine may call EvtDeviceDisableWakeAtBus and complete the previously pended wake request. It is the power policy owner's responsibility to bring the device back into the D0 state.

PowerWakeFailed

This event is sent when the driver calls the WdfDeviceCompleteWaitWakeRequest API with an unsuccessful NTSTATUS value and the device is currently armed for wake for wake at the bus level. In response to this event, the power state machine may call EvtDeviceDisableWakeAtBus and complete the previously pended wake request.

PowerWakeCanceled

This event is sent when the power policy owner attempts to cancel an outstanding wait wake request. In response to this event, the power state machine may call EvtDeviceDsiableWakeAtBus and complete the previously pended wake request.

PowerImplicitD0

This event is sent by both the power policy owner and non-owner state machines. In response to this event, the power state machine will bring the device into a D0 state. Upon completion of processing this event, the power state machine will send a PnpEventPowerUp event to the PnP state machine and a PwrPolPowerUp event to the power policy state machine.

PowerImplicitD3

This event is sent by both the power policy owner and non owner state machines. In response to this event, the power state machine will bring the device into the Dx state. Upon completion of processing this event, the power state machine will send a PnpEventPowerDown event to the PnP state machine and a PwrPolPowerDown event to the power policy state machine PowerParentToD0

This event is sent by the parent power state machine to each child state machine when the parent enters the D0 state.

PowerPowerPolicyStopRemove

This event is sent by the PnP state machine when the device receives an IRP_MN_QUERY_STOP_DEVICE or IRP_MN QUERY_REMOVE_DEVICE. In response to this event, the power state machine moves to a state where it will expect a PowerImplicitD3 event to be sent by the power policy state machine. When the PowerImplicitD3 event is received, the device will be moved into the Dx state and the appropriate callbacks will be called.

PowerPowerPolicySurpriseRemove

This event is sent by the PnP state machine when the device receives an IRP_MN_SURPRISE_REMOVAL. In response to this event, the power state machine will move to a state where it will expect a PowerImplicitD3 event to be sent by the power policy state machine. When the PowerImplicitD3 event is received, the device will not be moved into the Dx state since it is no longer present in the system. No event callback which is allowed to touch hardware will be called.

PoweerMarkPageable

This event is sent by the device when it receives an IRP_MN_DEVICE_USAGE_NOTIFICATION request disabling a device usage (such as being on the paging path). In response to this event, the power state machine may move from a non-pageable D0 state to a pageable D0 state if the device initially had the D0_POWER_PAGABLE flag set.

PowerMarkNonpageable

This event is sent by the device when it receives an IRP_MN_DEVICE_USAGE_NOTIFICATION request enabling a device usage (such as being on the paging path). In response to this event, the power state machine may move from a pageable D0 state to a non-pageable D0 state if the device initially had the D0_POWER_PAGABLE flag set.

WDFQUEUE

A Framework queue object is generally involved in PnP/Power in at least two ways. First, it should be possible for the Power state machine to cause certain device's queues to hold or release depending on what power state the device is in. Second, the queue should report to a Power Policy object when the queue transitions from idle to busy (by calling WdfDevicePowerReference) and from busy to idle (by calling WdfDevicePowerDereference.) In general, a driver should be able to stipulate that a queue is one that participates in power decisions or, it should stipulate that a queue is one that should not affect power decisions.

Framework Interfaces:

WDFFILEOBJECT

A Framework file object should be involved in PnP/Power in one instance at least. For example, it should allow for a driver to indicate that the device should not be put in a low power state while a particular file handle is open (by calling WdfDevicePowerReference and WdfDevicePowerDereference.)

This is mostly true for devices which do not have a clear way of knowing when they are active or when there is something plugged into them. The most common example would be a serial port, which may mark every open file handle as needing to keep the device active. This should generally be a rare requirement.

Figure 8:
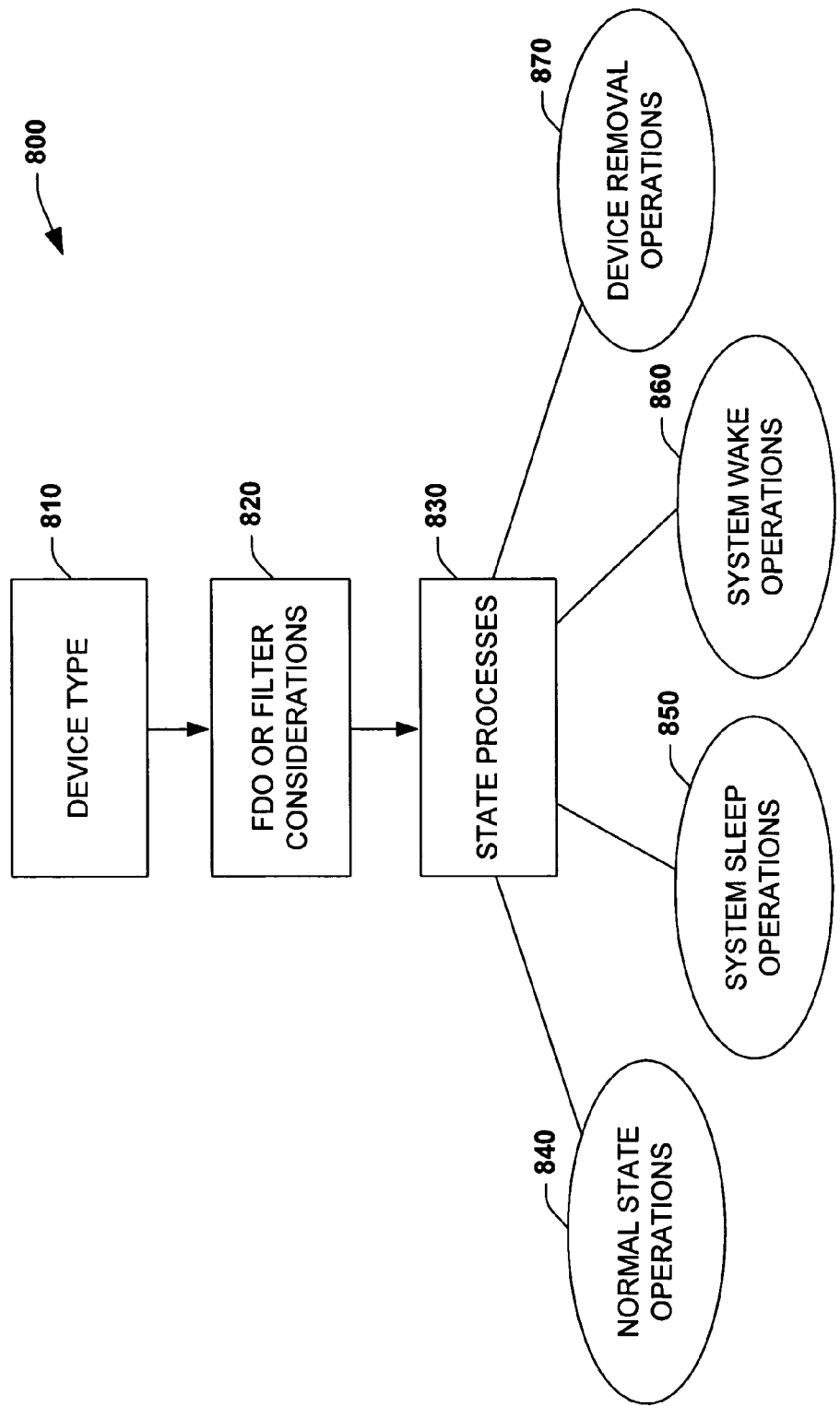
FIG. 8 is a flow diagram of an exemplary device, system, driver and state methodology in accordance with an aspect of the present invention.

FIG. 8 is a process 800 of an exemplary device, system, driver and state methodology in accordance with an aspect of the present invention. While, for purposes of simplicity of explanation, the methodology is shown and described as a series or number of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

The process 800 depicts some example considerations and system interactions such as device type considerations, filter considerations, and device operations. This process discussion is followed by some specific examples of the respective process components. In general, state processing in accordance with the present invention can be provided in accordance with a plurality of conditions and/or applications. Proceeding to 810 of the process 800, such conditions or state processes can change depending on several factors such as the type of device and associated driver that is interacting with the state machines previously described. For example, this can include interactions with software only type objects where there is no actual hardware to control and thus state processing is somewhat minimized. Other type devices can include self-contained devices having no internal power management considerations but are targets for other type operations such as a "selective suspend" state, and yet other devices interact with more directly with the various states and events previously described. Some examples of these and other situations are described below.

At 820, driver determinations and state processes can be affected by considerations of whether or not certain objects are present in a stack such as whether a Functional Driver Object (FDO) or filter object is present in the stack. At 830, various state processes are possible depending on the power management situation at hand. These can include normal state operations at 840, system sleep operations at 850, system wake operations at 860, and device removal operations at 870, whereby the following discussion illustrates various exemplary situations that may occur with respect to the process 800. It is to be appreciated that a plurality of PnP or Power Management processes can occur that are in accordance with the event and state processes previously described.

Example State Processing Considerations:

Software-Only "Device"

In this aspect, there is no actual hardware, thus there is no power to manage, and no "plug" to "play" with. Therefore, this device driver generally only needs to respond minimally to PnP and power IRPs.

Analysis for a Driver that is the FDO in this Stack

Since software only devices are not particularly interested in hardware related aspects, it generally only provides callbacks for:

EvtDeviceAdd—sets up per-instance data structures and readies itself for handling requests.

State Walkthrough Example:

Normal Operation:
1. When the driver is notified that an instance of itself is being installed on the machine (e.g., AddDevice function is called), the PnP state machine transitions to an initial state and EvtDeviceAdd is called.

Device Removal Example:
1. The PnP Manager sends a request for the driver to prepare itself for removal (e.g., IRP_MN_QUERY_REMOVE_DEVICE).
2. The PnP state machine transitions to a state wherein the Framework checks to see if the driver registered a preference for being not stoppable (e.g., going to theQueryRemoveStaticCheck state).
3. Since the driver hasn't marked itself as not stoppable, the Framework transitions to a state wherein the driver itself is commanded to halt pending operations (e.g., QueryRemoveAskDriver). It then calls EvtDevicesSelfManagedIoStop.
4. The PnP state machine then moves (assuming the previous operation succeeded) to a state wherein the Framework waits for the device to transition into a low-power state (e.g., QueryRemoveWaitForPowerStop state), and the Framework sends a PowerPolicyStopRemove event to the Power Policy state machine, which will request that the device is put into a low-power state. It then signals the PnP manager that it agrees to be removed.
5. The Power state machine, in response to PowerPolicyStopRemove, moves to a state wherein it waits to be put into a final low-power state (e.g., PowerPolicyStop state).
6. The Power Policy state machine moves to a state wherein it sends a move-to-low-power event (in Windows for example, IRP_MN_SET_POWER-D3) to all the drivers in the stack for this device. The Power state machine moves to a low-power state wherein it waits for the device to be removed (e.g., D3 state), holds the Top-Edge queues, sends the PowerDown event to the other two state machines, and completes the D3 IRP.
7. The Power Policy state machine moves in response to the PowerDown event moves to a state wherein it waits for the device to be removed.
8. The PnP state machine moves in response to the PowerDown event to the QueryRemovePending state.
9. The PnP manager sends a command to complete the device driver removal (e.g., IRP_MN_REMOVE_DEVICE).
10. The PnP state machine moves to a state wherein it flushes remaining requests from its queues, releases hardware resources that it has previously acquired, disables interfaces that it has offered to other system, and calls EvtDeviceSelfManagedIoCleanup. The driver tears down self-managed structures.
11. The PnP state machine transitions to a state wherein objects and structures allocated for the device are freed and calls EvtDeviceContextCleanup, which tears down structures built in EvtDeviceSoftwareInit.
12. The PnP manager deletes the device and the driver is unloaded.

Self-Contained Device with no Internal Power Management

This type device generally consists of a single device (e.g., PCI, USB or ISA) with no internal concept of power. It generally has no hardware states corresponding to D0, D1, D2 or D3. It may or may not be enumerable. It may or may not be removable.

Analysis for a Driver that is the FDO in this Stack
This driver would register for:
EvtDeviceAdd—sets up per-instance data structures and readies itself for handling requests.
EvtDeviceD0Entry—performs hardware initialization when the device enters D0. Even though the hardware doesn't support D-states, it may need to be reprogrammed when coming out of a sleep state.
EvtDeviceD0Exit—saves states that may need to be restored later
EvtDeviceContextCleanup—tears down per-instance data structures.

Since this driver is instantiated e.g., within Windows via an AddDevice call, and since this driver does not call WdfFdoInitSetFilter, it is automatically marked as the Power Policy Owner. This implies that the Framework will automatically create an instantiation of the Power Policy state machine to go along with it. This driver generally instantiates one WDFQUEUE object and lets the defaults remain, which implies that it responds to changes in power states.

System Going to Sleep Example:
1. The system power manager sends a request for the driver to ready itself to move to a low power state (e.g., IRP_MN_QUERY_POWER) with a target S-state of S4. The query IRP request is stateless, and Framework respond by default without involving the driver.
2. The system power manager sends a command (e.g., IRP_MN_SET_POWER) to move to a low power state that work when the system moves to a target state of S4. This causes the Power Policy state machine to transition to a state wherein the Framework determines whether the device must be armed for wake from Sx. Since the device has no notion of wake, it transitions to a state wherein it starts the process of moving the device to its lowest-power, non-armed state.

3. The Power Policy state machine sends a request (e.g., IRP_MN_SET_POWER) for all the drivers in the stack to move to a target state of D3, which causes the Power state machine to transition to a state wherein it prepares the device to be moved to the D3 state, as the Power state machine is handling the D3 IRP request, on the way down the stack. The Framework then calls TopEdge-QueueHold, which causes new IRPs requests coming into the queue to be queued and outstanding IRPs requests to complete. It then calls EvtDeviceD0Exit, which, because the IRP request is still on the way down, can collect state from the hardware and so forth.

4. The Power state machine sends the PowerDown event to the other state machines.

5. The Power Policy state machine transitions to a state wherein it waits for the system power manager to send it a command to move the device back into a state appropriate for system state S0, which will happen after the machine wakes itself up again.

System Waking Example:

1. The system wakes up and the system power manager sends a command (e.g., IRP_MN_SET_POWER) to move to a state that is appropriate for S0 as the target state. This causes the Power Policy state machine to transition to a state wherein the Framework checks to see if the device will operate in a mode that involves triggering its wake signal while the system is in the S0 state.

2. The Power Policy state machine moves to a state wherein the Framework checks to see if the device's idle timer has expired, since wake from S0 is generally not supported.

3. The Power Policy state machine immediately moves to a state wherein the device does not have a timer expired, since the device doesn't have an expired power timer. The Power Policy state machine then sends a request (e.g., IRP_MN_SET_POWER) to move to D0 as the target state.

4. The Power state machine reacts to the D0 IRP request by moving to a state wherein the Framework checks to see if this driver manages the bus-related aspects of the device or the function-related aspects of the device (e.g., the PDO or the FDO.), then the D0 state. It calls EvtDeviceD0Entry, which restores the hardware, and so forth. It re-enables the device's interrupt. It calls TopEdgeQueueRelease, which allows queued IRPs to be handled. Last, it sends the PowerUp event to the other state machines.

5. The Power Policy state machine reacts to PowerUp by moving back to a state wherein it waits for further events in the course of normal device operation.

PCI Device Which Supports D0, D3 and Wakeup via PME#

This device can be moved between "off" and "on." If there are no open handles to the device, it can be moved into D3. If a handle is opened when the device is in D3, then it will be moved to D0. At times the device is in D3, an external event may occur that will trigger PME#. This can result in the device being moved back into D0. This may happen when the machine is in S0, or when the machine is asleep. This type device may correspond roughly to a modem, for example.

Analysis for a Driver that is the FDO in this Stack

This driver would register for:
EvtDeviceAdd
EvtDeviceD0Entry
EvtDeviceD0Exit
EvtDeviceContextCleanup
EvtDevicePrepareHardware—Assimilates what the PnP manager assigned.
EvtDeviceReleaseHardware—Dissimilates what the PnP manager assigned.
EvtDeviceCreate—Tracks the number of open file handles. When called, it calls WdfDevicePowerReference.
EvtDeviceClose—Tracks the number of open file handles. When called, it calls WdfDevicePowerDereference.
EvtDeviceWakeArmFromS0—Sets up the device's internal state to enable wake.
EvtDeviceWakeArmFromSx—Registers the same function that was registered for the previous callback.
EvtDeviceWakeDisarmFromS0—Reverses what was done in "Arm" above.
EvtDeviceWakeDisarmFromSx—Registers the same function that was registered in the previous callback.
EvtDeviceWakeTriggeredFromS0—Notification that the device woke.
EvtDeviceWakeTriggeredFromSx—Similar as above.

State Walkthrough

Normal Startup:

1. When the driver's AddDevice is called, the PnP state machine transitions into state wherein the device context is set up and EvtDeviceAdd is called.

2. When a request from the PnP manager to begin device operation (e.g., IRP_MN_START_DEVICE) completes, the PnP state machine transitions into a state wherein the Framework interlocks the start operations implied by PnP and Power Management, and calls EvtDevicePreparHardware and sends a PowerPolicyStart event.

3. The Power Policy state machine then transitions into state wherein it recognizes that the device is being started and sends an event, PowerImplicitD0, back to the power state machine.

4. Since wake from S0 is supported, the Power Policy state machine then transitions into state wherein it considers a device's idle timeout and starts the power timeout, setting it for an appropriate length chosen by the driver, perhaps about 5 seconds. Meanwhile, the Power state machine consumes the PowerImplicitD0 event and moves to the D0 state and calls EvtDeviceD0Entry which connects interrupts and unblocks queues.

One of at least two sub-scenarios may happen next. First, bringing the device on line may cause an application or service that is registered for device notification to open a handle to this device. Second, no handles may be opened.

Handle Immediately Opened Case:

1. The Framework calls EvtDeviceCreate, which calls WdfPowerPolicyPowerReference.

2. This causes the power idle timer to be cancelled. The Power Policy state machine remains in a state wherein it considers whether a device timeout is appropriate.

Handle Not Opened Case:

1. The power idle timer fires after five seconds or suitable passage of time, causing the Power Policy state machine to transition into a state wherein it recognizes that the timer has expired.

2. The Power Policy state machine invokes EvtDeviceArmWakeFromS0.
3. The Power Policy state machine sends a request to all the drivers in the device stack (e.g., IRP_MN_WAIT_WAKE) which triggers those drivers to arm the device's wake signal.
4. The Power state machine transitions into a state wherein it recognizes that the next transition to a low power state should be accompanied by arming the device for wake (e.g., D0ArmedForWake state).
5. The Power Policy state machine sends a command to all drivers in the stack (e.g., IRP_MN_SET_POWER) to move to the hardware to the D3 state.
6. The Power state machine transitions into state wherein it moves the device into its lowest-power state and invokes EvtDeviceD0Exit, disconnects the device's interrupt and sends the PowerDown event.
7. The Power Policy state machine transitions into a state wherein it waits for the wake signal to be triggered or for I/O to arrive at the driver for processing. It remains here until the wake signal fires or a handle to the device is opened.

This above situation leads to at least two cases, the wake signal fires and a handle is opened. First, what happens when a handle is opened:

1. The Framework calls EvtDeviceCreate, which calls WdfPowerPolicyPowerReference.
2. This causes the event PowerPolicyIoPresent to fire, which causes the Power Policy state machine to transition into a state wherein it recognizes that the device should be in a higher-power state before I/O can, and then to cancel the wake signal request, (e.g, IRP_MN_WAIT_WAKE). Next, it sends a command to move to the D0 state, (e.g., IRP_MN_SET_POWER).
3. The Power state machine then transitions D0 state, which connects the interrupt, calls EvtDeviceD0Entry, starts the I/O queues and sends the PowerUp event. PowerUp causes the Power Policy state machine to transition back to a state wherein it waits for further events.

If, instead, a wake signal is triggered:

1. The bus driver completes the Wake signal request (e.g., IRP_MN_WAIT_WAKE).
2. The Power Policy state machine transitions into a state wherein it recognizes that a wake signal was triggered. It then sends a command to all the drivers in the device stack (e.g., IRP_MN_SET_POWER-D0) to move to the D0 state.
3. This causes the Power state machine to transition to the D0 state calling PowerUp.
4. The Power Policy state machine transitions to a state wherein it notifies the driver that its device actually triggered its wake signal. It then calls EvtDeviceWakeFromS0Triggered and then EvtDeviceDisarmWakeFromS0.
5. The Power Policy state machine then transitions to a state wherein it waits for further events.

Figure 9:
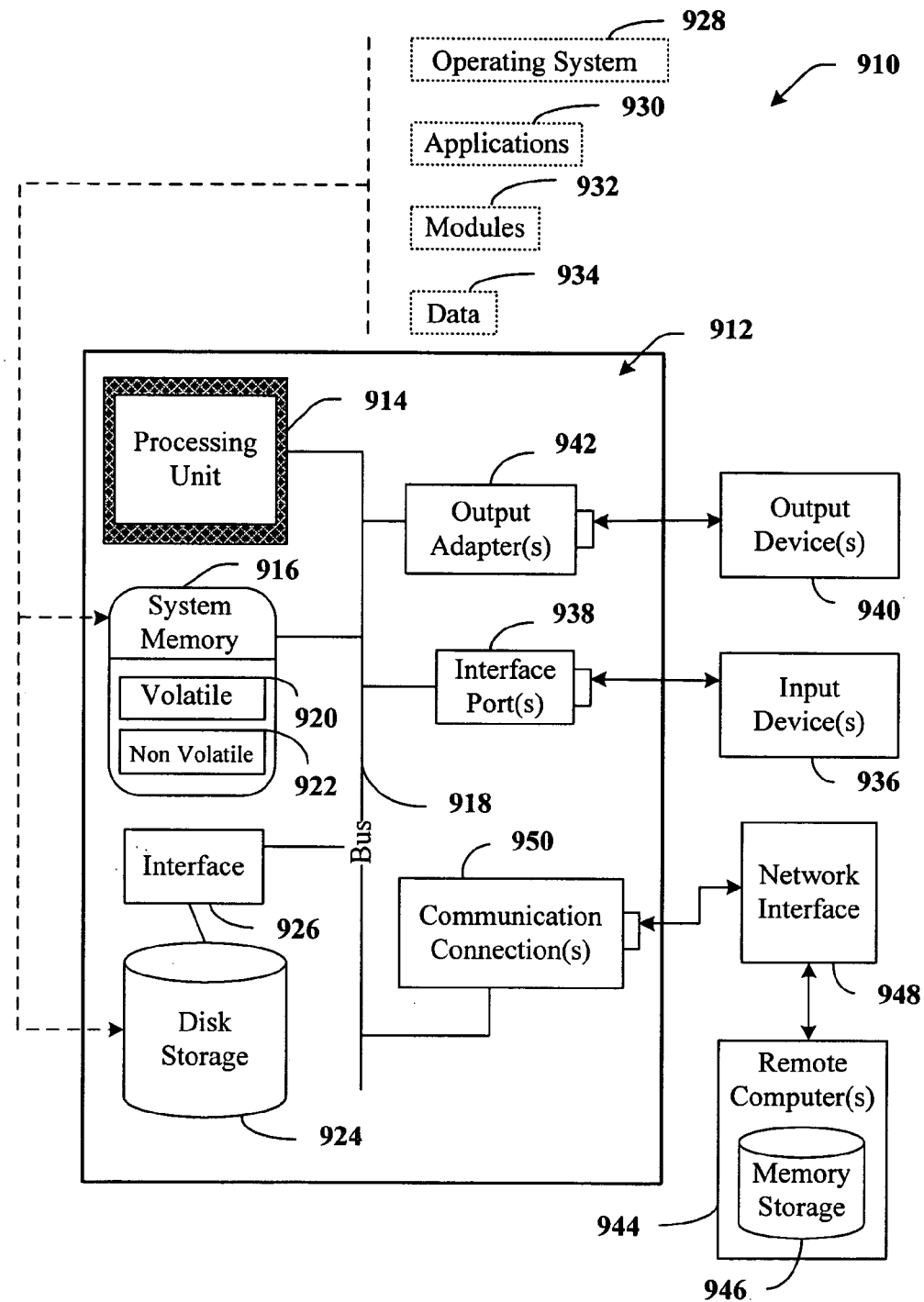
FIG. 9 is a schematic block diagram illustrating a suitable operating environment in accordance with an aspect of the present invention.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
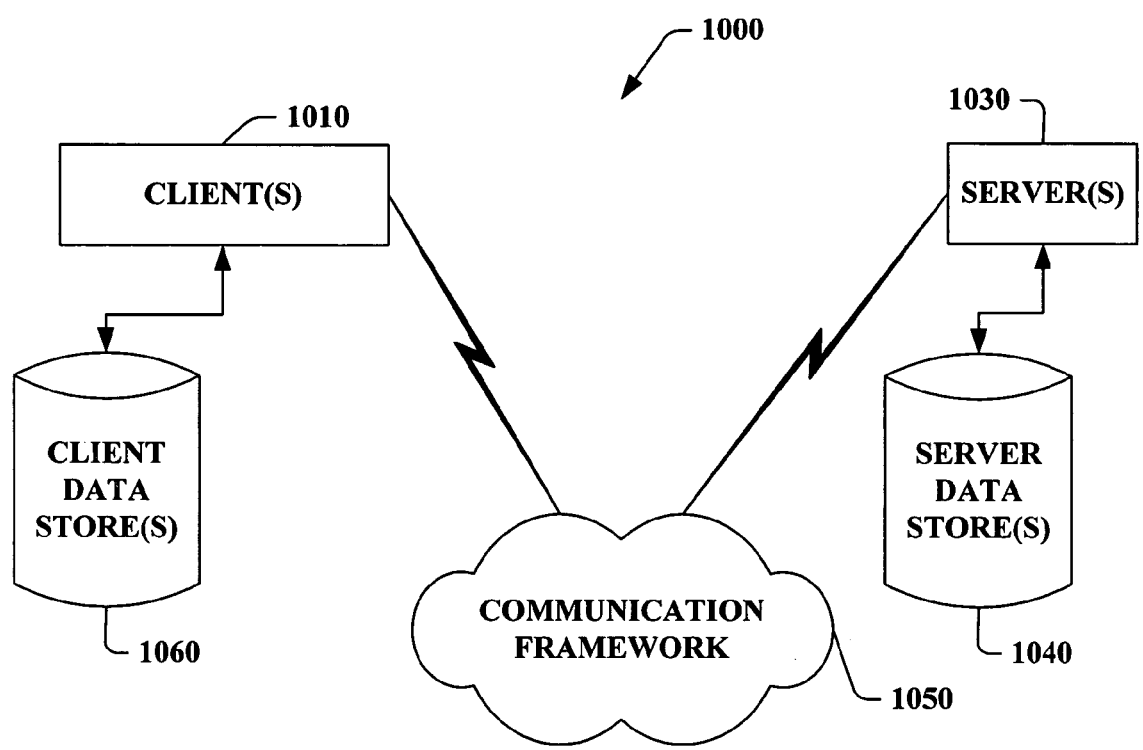
FIG. 10 is a schematic block diagram of a sample-computing environment with which the present invention can interact.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the present invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising the following computer executable components:
   an operating system framework that interacts with a plurality of device drivers;
   a middleware layer as part of the operating system framework that processes driver power requirements and offloads power management considerations from the plurality of device drivers,
   the middleware layer positioned between device driver and operating system tasks in a layering arrangement of the operating system framework, the middleware layer further comprising a PnP State machine, a Power State machine, and a Power Policy State machine that interact with events to control and synchronize power operations for the operating system framework.

2. The system of claim 1, the Power state machine is instantiated in at least one driver associated with the events.

3. The system of claim 1, the Power Policy state machine is instantiated in at least one driver when at least one other driver in a stack is a power policy owner.

4. The system of claim 1, the Power state machine responds to I/O request data sent by the Power Policy state machine from the same driver.

5. The system of claim 1, the Power state machine responds to I/O request data sent by the Power Policy state machine from a different driver.

6. The system of claim 1, the Power state machine responds to power I/O request data sent by a driver that implements a third-party Power Policy state machine.

7. The system of claim 1, the Power Policy state machine receives system power I/O request data as input.

8. The system of claim 1, the Power Policy state machine receives device usage as input.

9. The system of claim 8, wherein device usage is a count of open file handles.

10. The system of claim 8, wherein device usage relates to a presence of non-PnP or non-Power I/O request packets in a driver queue.

11. The system of claim 8, wherein device usage is measured as an inverse of time since a device was last sent a non-PNP or non-Power I/O request packet.

12. The system of claim 1, the Power Policy state machine processes wake signal management.

13. The system of claim 12, the Power Policy state machine processes transmission of IRP_MN_WAIT_WAKE which is associated with the wake signal management.

14. A system that facilitates unified power management, comprising:
   means for offloading power management considerations from a device driver;
   means for processing device power events, system power events, and Plug and Play power events in a generalized manner;
   means for providing system and device level synchronization of Plug and Play and power event in a unified layer;
   means for managing states associated with the events;
   means for managing device power states by calling driver-supplied functions; and
   means for determining the power level of at least one device based at least in part on the states.

15. A method for generalized operating system power management, comprising:
- offloading power management considerations from a device driver to a middleware layer of an operating system framework;
- employing generalized state management operations to process Plug and Play (PNP) events;
- Power events and Power Policy events; and
  - coordinating the events between at least one device driver or a device control module and the operating system framework to determine a change in state, a power level of one or more devices determined based on the change in state.

16. The method of claim 15, further comprising at least one of:
- managing at least two states for the events; and
- causing entry into states that cause transitions to occur in at least one other state.

17. The method of claim 15, further comprising inputting a Power Up event into a Power Policy state machine and a PnP state machine.

18. The method of claim 17, further comprising entry into a lower or higher power state that causes a Power Down event to be fed into the Power Policy state machine and the PnP state machine.

19. The method of claim 15, further comprising releasing a subset of I/O queues in a driver in order that additional requests can be processed, and releasing the subset of I/O queues in response to state changes or blocking the subset of I/O queues in response to the state changes.

20. The method of claim 19, further comprising processing state operations in a normal operating mode for a driver.

21. The method of claim 19, further comprising processing state operations from a sleep mode for a driver.

22. The method of claim 21, further comprising processing state operations upon waking from the sleep mode.

23. The method of claim 19, further comprising processing state operations upon removal of a device.

24. The method of claim 17, the Power Policy state machine receives inputs from operating system state changes including system management events initiated by an administrator.

25. The method of claim 17, the PnP state machine receives inputs related to additional actions including system-wide attempts to rebalance resources between hardware devices.

26. The method of claim 24, further comprising employing an idle state machine for tracking device states of idleness.

27. The method of claim 26, the idle state machine can differentiate between actions in different contexts.

28. The method of claim 17, at least one of the PnP state machine, the Power Policy state machine, and a Power state machine allow a driver to continue operation during at least one operating system resource allocation failure.

29. The method of claim 17, at least one of the PnP state machine, the Power Policy state machine, and a Power state machine allow an operating system to continue operation during at least one driver operational error.

30. The method of claim 17, the at least one of the PnP state machine, the Power Policy state machine, and a Power state machine allow an operating system to process unloading or restarting the driver.

* * * * *